(12) United States Patent
Araki et al.

(10) Patent No.: US 9,099,141 B2
(45) Date of Patent: Aug. 4, 2015

(54) RADIATION-CURABLE VINYL CHLORIDE RESIN COMPOSITION AND MAGNETIC RECORDING MEDIUM USING THE SAME

(75) Inventors: Katsumi Araki, Odawara (JP); Kazufumi Omura, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 535 days.

(21) Appl. No.: 12/847,607

(22) Filed: Jul. 30, 2010

(65) Prior Publication Data

US 2011/0027619 A1    Feb. 3, 2011

(30) Foreign Application Priority Data

Jul. 31, 2009  (JP) .................................. 2009-179960
Jul. 23, 2010  (JP) .................................. 2010-165911

(51) Int. Cl.

| | | |
|---|---|---|
| G11B 5/706 | (2006.01) | |
| G11B 5/702 | (2006.01) | |
| C08F 214/06 | (2006.01) | |
| C08K 5/08 | (2006.01) | |

(52) U.S. Cl.
CPC ............ *G11B 5/7026* (2013.01); *C08F 214/06* (2013.01); *C08K 5/08* (2013.01); *G11B 5/7023* (2013.01)

(58) Field of Classification Search
None
See application file for complete search history.

(56) References Cited

U.S. PATENT DOCUMENTS

| | | | | |
|---|---|---|---|---|
| 4,957,953 | A * | 9/1990 | Kikkawa et al. ................. 524/99 |
| 5,021,292 | A * | 6/1991 | Imai et al. ..................... 428/323 |
| 5,273,830 | A * | 12/1993 | Yaguchi et al. ................ 428/523 |
| 5,294,233 | A * | 3/1994 | Kitahara et al. ................ 44/334 |
| 5,935,703 | A * | 8/1999 | Deno et al. .................... 428/336 |
| 6,447,649 | B1 * | 9/2002 | Arhancet ........................... 203/8 |
| 7,001,955 | B2 | 2/2006 | Sasaki et al. | |
| 2004/0241497 | A1 | 12/2004 | Sasaki et al. | |
| 2008/0075883 | A1 * | 3/2008 | Hayata et al. ................. 427/542 |
| 2009/0142622 | A1 * | 6/2009 | Nakamura ..................... 428/831 |

FOREIGN PATENT DOCUMENTS

| | | |
|---|---|---|
| JP | 3125947 B2 | 7/1993 |
| JP | 2004-352804 A | 12/2004 |
| JP | 2005-008866 A | 1/2005 |

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a radiation-curable vinyl chloride resin composition comprising a vinyl chloride resin containing a radiation-curable functional group, and/or starting material compounds thereof, as well as a benzoquinone compound.

15 Claims, No Drawings

RADIATION-CURABLE VINYL CHLORIDE RESIN COMPOSITION AND MAGNETIC RECORDING MEDIUM USING THE SAME

CROSS-REFERENCE TO RELATED APPLICATIONS

This application claims the benefit of priority under 35 USC 119 to Japanese Patent Application No. 2009-179960, filed on Jul. 31, 2009, and Japanese Patent Application No. 2010-165911, filed on Jul. 23, 2010, which are expressly incorporated herein by reference in their entirety.

BACKGROUND OF THE INVENTION

1. Field of the Invention

The present invention relates to a radiation-curable vinyl chloride resin composition and to a method of manufacturing the same. More particularly, the present invention relates to a radiation-curable vinyl chloride resin composition having both good storage stability and curability, and to a method of manufacturing the same.

The present invention further relates to a vinyl chloride resin formed of the above composition, a magnetic recording medium comprising a radiation-cured layer formed of the above composition, and a storage stabilizer for radiation-curable vinyl chloride resin.

2. Discussion of the Background

In particulate magnetic recording media, binders play important roles in the dispersibility of magnetic particles, coating durability, electromagnetic characteristics, running durability, and the like. Accordingly, various research has been conducted on binders for magnetic recording media.

Conventionally, thermosetting resins and thermoplastic resins such as vinyl chloride resins, polyurethane resins, polyester resins, and acrylic resins have been widely employed as binders in magnetic recording media. In contrast, in recent years, the use of radiation-curable resins incorporating radiation-curable functional groups as binders for magnetic recording media has been proposed to obtain tougher coatings with good productivity. For example, Japanese Unexamined Patent Publication (KOKAI) No. 2004-352804 or English language family member US2004/0241497A1 and U.S. Pat. No. 7,001,955, Japanese Unexamined Patent Publication (KOKAI) No. 2005-8866, and Japanese Patent No. 3,125,947, which are expressly incorporated herein by reference in their entirety, propose the use of radiation-curable vinyl chloride resin as a magnetic recording medium-use binder.

Radiation-curable resins are generally synthesized either by using a monomer having a radiation-curable functional group to conduct a polymerization reaction, or by reacting a compound having a radiation-curable functional group with a polymer to introduce a radiation-curable functional group into the side chain of the polymer. These reactions are normally conducted in the presence of a polymerization-inhibiting agent to prevent the radiation-curable functional group from reacting. For example, the above publications describe conducting the synthesis reaction of a radiation-curable vinyl chloride resin in the presence of 2,6-tert-butyl-4-methylphenol (BHT) or hydroquinone.

In the course of the large-scale production of particulate magnetic recording media, the coating liquids are sometimes stored for longer periods of half a year or more, for example. However, vinyl chloride binders are generally of poor stability. In particular, when employing a radiation-curable vinyl chloride resin, the stability of the coating liquid may decrease markedly. This has been attributed to change in the molecular weight due to the reaction of radiation-curable functional groups during storage. However, when the above polymerization inhibiting agent is increased to inhibit reaction of the radiation-curable functional groups during storage, the curability during irradiation may decrease, making it difficult to obtain a tough coating.

No means of achieving both long-term storage stability in a radiation-curable vinyl chloride resin and curability when irradiated with radiation has been discovered thus far.

SUMMARY OF THE INVENTION

An aspect of the present invention provides for a radiation-curable vinyl chloride resin that has both good storage stability and curability, and thus is suited to use in magnetic recording media.

The present inventors conducted extensive research into achieving the above-stated radiation-curable vinyl chloride resin, resulting in the discovery that using a benzoquinone compound in a radiation-curable vinyl chloride resin made it possible to maintain good long-term storage stability without losing curability.

The present invention was devised based on this knowledge.

An aspect of the present invention relates to a radiation-curable vinyl chloride resin composition comprising a vinyl chloride resin containing a radiation-curable functional group, and/or starting material compounds thereof, as well as a benzoquinone compound.

The above radiation-curable functional group may be a (meth)acryloyloxy group.

The above vinyl chloride resin may comprise a sulfonic acid (salt) group.

The above radiation-curable vinyl chloride resin composition may further comprise a piperidine-1-oxyl compound and/or a nitro compound.

The above radiation-curable vinyl chloride resin composition may comprise the benzoquinone compound in a quantity of equal to or higher than 100 ppm but equal to or lower than 100,000 ppm, relative to the vinyl chloride resin.

The above radiation-curable vinyl chloride resin composition may be used as a coating liquid for forming a magnetic recording medium or used for preparing the coating liquid.

A further aspect of the present invention relates to a method of manufacturing the above radiation-curable vinyl chloride resin composition, which comprises conducting a reaction of introducing a radiation-curable functional group into a vinyl chloride resin in the presence of a benzoquinone compound to obtain a vinyl chloride resin containing a radiation-curable functional group.

A still further aspect of the present invention relates to a vinyl chloride resin obtained by radiation-curing the above radiation-curable vinyl chloride resin composition.

A still further aspect of the present invention relates to a magnetic recording medium comprising a magnetic layer containing a ferromagnetic powder and a binder on a nonmagnetic support, which comprises at least one radiation-cured layer obtained by radiation-curing a coating layer comprising the above radiation-curable vinyl chloride resin composition.

In the above magnetic recording medium, the radiation-cured layer may be the magnetic layer.

The above magnetic recording medium may comprise a nonmagnetic layer containing a nonmagnetic powder and a binder between the nonmagnetic support and the magnetic layer and the nonmagnetic layer may be the radiation-cured layer.

A still further aspect of the present invention relates to a storage stabilizer for a radiation-curable vinyl chloride resin comprising a benzoquinone compound.

The above storage stabilizer may further comprise a piperidine-1-oxyl compound and/or a nitro compound.

The present invention can provide a radiation-curable vinyl chloride resin composition, having good long-term storage stability and good curability (a good crosslinking property) when irradiated with radiation, that is suited to use in magnetic recording media.

The radiation-curable vinyl chloride resin composition of the present invention can exhibit good curability when irradiated with radiation and is capable of forming a coating layer such as a magnetic layer or nonmagnetic layer of good coating strength even when used to form such a coating layer after extended storage. In contrast to the extended period of thermoprocessing that is required to cure the coating when a thermosetting resin is employed as binder in a magnetic recording medium, the coating can be cured by a short period of irradiation with a radiation-curable resin, which is advantageous from the perspective of productivity.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Radiation-Curable Vinyl Chloride Resin Composition

The radiation-curable vinyl chloride resin composition of the present invention (also referred to simply as a "resin composition" or "composition" hereinafter) comprises a vinyl chloride resin containing a radiation-curable functional group (also referred to as a "radiation-curable vinyl chloride resin" hereinafter) and/or the starting material compounds thereof and a benzoquinone compound.

As set forth above, there is a tradeoff between the long-term storage stability of a radiation-curable binder and curability when irradiated with radiation; these properties have conventionally been difficult to achieve simultaneously. By contrast, the present invention employs a benzoquinone compound to maintain good long-term storage stability without loss of curability in a radiation-curable vinyl chloride resin.

The resin composition of the present invention need only comprise the above-described components at a minimum. It can also contain optional solvents, polymerization initiators, catalysts, and various other components commonly employed in polymer synthesis in addition to these components.

Further, the resin composition of the present invention may be in a single-liquid form in which a single liquid contains all components, may be in a two-liquid form in which a first liquid and a second liquid are successively mixed together, or may be in a multiple liquid form comprising three or more liquids. For example, a first liquid comprising the vinyl chloride resin and benzoquinone compound and a second liquid comprising a compound containing radiation-curable functional groups may be stored as separate liquids. The first liquid and the second liquid may then be admixed to conduct a reaction incorporating the radiation-curable functional groups into the vinyl chloride resin.

The various components contained in the radiation-curable vinyl chloride resin composition of the present invention will be described in greater detail below.

(i) Radiation-Curable Vinyl Chloride Resin Composition and its Starting Material Compounds The radiation-curable functional groups contained in the radiation-curable vinyl chloride resin composition are not specifically limited other than that they be capable of undergoing a curing reaction (crosslinking reaction) when irradiated with radiation. However, from the perspective of reactivity, a radical polymerizable carbon-carbon double bond group is desirable, and an acrylic double-bond group is preferred. In this context, the term "acrylic double-bond group" refers to a residue of acrylic acid, acrylic acid ester, amide acrylate, methacrylic acid, methacrylic acid ester, or amide methacrylate. Of these, from the perspective of reactivity, a (meth)acryloyloxy group is desirable. In the present invention, the term "(meth)acryloyloxy group" includes both a methacryloyloxy group and an acryloyloxy group, and the term "(meth)acrylate" includes both methacrylate and acrylate.

The "vinyl chloride resin" is a polymer or copolymer of a vinyl chloride monomer. The resin composition of the present invention may comprise a radiation-curable vinyl chloride resin itself; or the starting materials of a radiation-curable vinyl chloride resin. Examples of the starting material compounds of a radiation-curable vinyl chloride resin are a vinyl chloride resin not containing radiation-curable functional groups, vinyl chloride monomers serving as the starting material monomers of a vinyl chloride resin, copolymer monomers, and compounds containing radiation-curable functional groups. The radiation-curable vinyl chloride resin may be in the form of any one of (A-1) to (A-3) below.

(A-1) is obtained by employing a monomer containing a radiation-curable functional group as at least one from among the vinyl chloride monomers and copolymer monomers that are the starting material monomers of the vinyl chloride resin.
(A-2) is obtained by polymerizing or copolymerizing starting material monomers of the vinyl chloride resin in the presence of a compound containing a radiation-curable functional group.
(A-3) is obtained by incorporating a radiation-curable functional group as a side chain into the vinyl chloride resin by a polymerization reaction.

Examples of the copolymer monomer that can be used in forms (A-1) and (A-2) are: vinyl acetate, vinyl propionate, and other fatty acid vinyl esters; methyl (meth)acrylate, ethyl (meth)acrylate, isopropyl (meth)acrylate, butyl (meth)acrylate, benzyl (meth)acrylate, and other acrylates; methacrylates; allylmethylether, allylethylether, allylpropylether, allylbutylether, and other alkylallylethers; styrene; α-methylstyrene; vinylidene chloride; acrylonitrile; ethylene; butadiene; acrylamide; copolymer monomers containing functional groups in the form of vinyl alcohols; 2-hydroxyethyl (meth)acrylate; polyethyleneglycol (meth)acrylate; 2-hydroxypropyl (meth)acrylate; 3-hydroxypropyl (meth)acrylate; polypropylene glycol (meth)acrylate; 2-hydroxyethylallylether; 2-hydroxypropylallylether; 3-hydroxypropylallylether, p-vinylphenol; maleic acid, maleic anhydride; acrylic acid; methacrylic acid; glycidyl (meth)acrylate; allylglycidylether; phosphoethyl (meth)acrylate; sulfoethyl (meth)acrylate, p-styrenesulfonic acid; Na salts of the above; K salts of the above; and compounds obtained by incorporating radiation-curable functional groups into the above copolymer monomers. The composition of the vinyl chloride monomer in the vinyl chloride resin is desirably equal to or higher than 60 weight percent but equal to or lower than 95 weight percent. Remaining within this range is desirable in that good mechanical strength can be achieved with good solvent solubility, and good dispersibility can be attained due to suitable solution viscosity.

Examples of the radiation-curable functional group-containing compound employed to incorporate the radiation-curable functional group in forms (A-2) and (A-3) above are: (meth)acrylic acid, glycidyl (meth)acrylate, hydroxyalkyl (meth)acrylate, 2-isocyanatoethyl (meth)acrylate, 2-(meth) acryloyloxyethyl isocyanate, and other compounds containing carbon-carbon double bond groups.

Taking into account the convenience and cost of synthesis and the availability of materials, the form of (A-3) above is desirable. The vinyl chloride resin employed in form (A-3) is not specifically limited. Vinyl chloride resin containing an active hydrogen group such as a hydroxyl group, primary amine, or secondary amine within the molecule is desirable because it can be reacted with an isocyanate compound containing a radiation-curable functional group to readily incorporate the radiation-curable functional group into a side chain. Such a vinyl chloride resin can be synthesized by a known method or obtained as a commercial product. Examples of commercially available products are MR110, MR104, MR112, and MR113 from Zeon Corporation; Solvain A, Solvain TAO, Solvain MK6 from Nissin Chemical Co., Ltd.; and the like.

Polar groups are widely incorporated into the binder employed in magnetic recording media to enhance the dispersion of magnetic powders, nonmagnetic powders and the like. It is also desirable to incorporate polar groups into the radiation-curable vinyl chloride resin to enhance dispersion. Examples of the polar groups are hydroxyalkyl groups, carboxylic acid (salt) groups, sulfonic acid (salt) groups, sulfuric acid (salt) groups, and phosphoric acid (salt) groups. As indicated in Examples further below, a radiation-curable vinyl chloride resin composition that contains sulfonic acid (salt) groups can be stored in a stable state for an extended period by storing it in the presence of a benzoquinone compound and will exhibit good curability when irradiated with radiation.

In the present invention, the term "sulfonic acid (salt)" refers to substituents denoted by general formula (1), below, that contain sulfonic acid groups (—SO$_3$H) and sulfonate groups such as —SO$_3$Na, —SO$_3$Li, and —SO$_3$K. The same applies to carboxylic acid (salt) groups, sulfuric acid (salt) groups, and phosphoric acid (salt) groups.

$$*\text{—SO}_3\text{M} \qquad (1)$$

In general formula (I) above, M denotes a hydrogen atom or a cation and an "*" denotes the position of a bond.

The cation can be an organic or inorganic cation. The cation electrically neutralizes the —SO$_3^-$ in general formula (1). It is not limited to monovalent cations, and can be a divalent or greater cation. The cation denoted by M is desirably a monovalent cation. The use of a cation with a valence of n means (1/n) moles of cations for the substituent denoted by general formula (1).

The inorganic cation is not specifically limited. An alkali metal ion or alkaline earth metal ion is desirable, an alkali metal ion is preferred, and Li$^+$, Na$^+$, or K$^+$ is of greater preference.

Examples of organic cations are ammonium ions, quaternary ammonium ions, and pyridinium ions.

M is desirably a hydrogen atom or an alkali metal ion, preferably a hydrogen atom, Li$^+$, Na$^+$, or K$^+$, and more preferably, K$^+$.

The radiation-curable vinyl chloride resin may contain a single substituent such as the substituent denoted by general formula (1), or two or more such substituents. The incorporation of multiple substituents is sometimes desirable in that it enhances the solubility of the vinyl chloride resin in solvents such as cyclohexanone that are employed in the field of magnetic recording media more than the incorporation of a single substituent. The above polar groups can be incorporated into the vinyl chloride resin by copolymerization or addition reaction by a known method. Further, the vinyl chloride resin into which the polar groups have been incorporated can also be obtained as a commercial product. Examples of tradenames of vinyl chloride resins containing sulfonic acid (salt) groups are MR104, MR110, and MR120 from Zeon Corporation. Sulfonic acid (salt) group-containing vinyl chloride resins can also be subjected to salt exchange by known methods to obtain other sulfonate group-containing vinyl chloride resins. The salts can also be removed by known methods to obtain sulfonic acid-containing vinyl chloride resin.

The synthesis reaction of the vinyl chloride resin and the radiation-curable functional group or polar group-incorporating reaction can be conducted by dissolving the starting material compounds in a solvent (reaction solvent), and heating, pressurizing, backfilling with nitrogen, and the like as needed. Commonly employed reaction conditions, such as the reaction temperature and reaction time, can be employed in the reaction.

Known reaction catalysts can be employed as the catalyst suitable for use in the above reaction. Examples are amine catalysts, organic tin catalysts, and organic bismuth catalysts. Examples of amine catalysts are diethylene triamine, N-methylmorpholine, tetramethylhexamethylenediamine, dimethylformamide, dimethylacetamide, and N-methylpyrrolidone. Examples of organic tin catalysts are dibutyltin dilaurate, dioctyltin dilaurate, dibutyltin didecanate, and dioctyltin didecanate. An example of an organic bismuth catalyst is bismuthtris(2-ethylhexanoate). An organic tin catalyst or an organic bismuth catalyst is desirably employed as the catalyst in the present invention.

The quantity of catalyst added is, for example, 0.00001 to 5 weight parts, preferably 0.00001 to 1 weight part, and more preferably, 0.00001 to 0.1 weight part, per the total weight of the starting materials employed in the reaction.

The reaction solvent can be selected from among known solvents commonly employed in the above reaction. Examples are: ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethyl formamide, N,N-dimethyl acetamide, and N-methylpyrrolidone; sulfoxide solvents such as dimethyl sulfoxide; methylene chloride; chloroform; and cyclohexane. The solvent employed as the reaction solvent above can be incorporated as the solvent in the resin composition of the present invention. The incorporation of methyl ethyl ketone, cyclohexanone, and mixed solvents thereof, which are widely employed in coating liquids for forming magnetic recording media, are preferably employed. The composition containing this solvent can be employed as is, or optional additives can be added for use as a coating liquid for forming magnetic recording media.

The radiation-curable vinyl chloride resin contained in the resin composition of the present invention or the radiation-curable vinyl chloride resin obtained by reacting the above starting material compounds will be described next.

(a) Average Molecular Weight and Molecular Weight Distribution

The radiation-curable group-containing vinyl chloride resin desirably has a weight average molecular weight of equal to or greater than 10,000 but equal to or less than 500,000 (in the present invention, the phrasing "equal to or greater than 10,000 but equal to or less than 500,000" can also be expressed as "10,000 to 500,000"; identical below), preferably 10,000 to 400,000, and more preferably, 10,000 to 300,000. A weight average molecular weight of equal to or greater than 10,000 is desirable in that good storage properties can be achieved in a coating layer formed using the radiation-curable vinyl chloride resin as binder. Further, a weight average molecular weight of equal to or less than 500,000 is desirable in that good dispersion an be achieved.

The molecular weight distribution (Mw/Mn) of the above radiation curable group-containing vinyl chloride resin is desirably 1.00 to 5.50, preferably 1.01 to 5.40. A molecular weight distribution of equal to or higher than 5.5 is desirable in that there is little composition distribution and good dispersion can be achieved. The weight average molecular weight and molecular weight distribution (Mw/Mn) normally change little before and after the reaction incorporating a radiation-curable functional group and/or polar group into the vinyl chloride resin.

(b) Glass Transition Temperature

The glass transition temperature (Tg) of the radiation-curable vinyl chloride resin is desirably 10 to 180° C., preferably 10 to 170° C. A glass transition temperature of equal to or greater than 10° C. is desirable in that a high-strength coating can be formed by irradiation with radiation, yielding a coating of good durability and storage properties. When the resin composition of the present invention is employed as a coating liquid for a magnetic recording medium, a glass transition temperature of the radiation-curable vinyl chloride resin contained of equal to or lower than 180° C. is desirable in that calendering moldability can be good even when calendering is conducted after irradiation with radiation and in that a magnetic recording medium of good electromagnetic characteristics can be obtained. The glass transition temperature (Tg) of the coating formed by radiation curing the above radiation-curable vinyl chloride resin is desirably 30 to 200° C., preferably 40 to 160° C. A glass transition temperature of equal to or higher than 30° C. is desirable in that good coating strength can be achieved and durability and storage properties can be enhanced. In a magnetic recording medium, a glass transition temperature of equal to or lower than 200° C. in the coating is desirable in that calendering moldability and electromagnetic characteristics can be good.

(c) Polar Group Content

The radiation-curable vinyl chloride resin desirably contains a polar group as set forth above.

The content of the polar group in the radiation-curable vinyl chloride resin is desirably 1.0 mmol/kg to 3.500 mmol/kg, preferably 1.0 mmol/kg to 3.000 mmol/kg, and more preferably, 1.0 mmol/kg to 2.500 mmol/kg.

A polar group content of equal to or greater than 1.0 mmol/kg is desirable in that it yields an adequate adsorptive force to magnetic material as well as good dispersion. A content of equal to or lower than 3.500 mmol/kg is desirable in that it yields good solubility in solvent. The sulfonic acid (salt) group denoted by general formula (1) is desirable as the polar group. Examples of other polar groups are hydroxyalkyl groups, carboxylic acid (salt) groups, sulfuric acid (salt) groups, and phosphoric acid (salt) groups, with —OSO$_3$M', —PO$_3$M$_2$, —COOM', and —OH being desirable. Of these, —OSO$_3$M' is preferred. M' denotes a hydrogen atom or a monovalent cation. Examples of monovalent cations are alkali metals and ammonium.

(d) Hydroxyl Group Content

Hydroxyl groups (OH groups) can also be incorporated into the radiation-curable vinyl chloride resin. The number of OH groups incorporated is desirably 1 to 100,000 per molecule, preferably 1 to 10,000 per molecule. When the number of OH groups falls within this range, dispersion can be good because solubility in solvent can be enhanced.

(e) Radiation-Curable Functional Group Content

The details of the radiation-curable functional group contained in the radiation-curable vinyl chloride resin are as set forth above. The content is desirably 1.0 mmol/kg to 4.000 mmol/kg, preferably 1.0 mmol/kg to 3.000 mmol/kg, and more preferably, 1.0 mmol/kg to 2.000 mmol/kg. A radiation-curable functional group content of equal to or greater than 1.0 mmol/kg is desirable in that a coating of high strength can be formed by radiation curing. A radiation-curable functional group content of equal to or lower than 4.000 mmol is desirable in that good calendering moldability can be achieved even when calendering is conducted after radiation curing, and in that a magnetic recording medium with good electromagnetic characteristics can be obtained when the resin composition of the present invention is employed as a coating liquid for forming a magnetic recording medium. The present invention can enhance long-term storage properties of the radiation-curable vinyl chloride resin containing radiation-curable functional groups in the above suitable quantity, without compromising the curability.

(ii) Benzoquinone Compound

The benzoquinone compound is a compound comprising a benzoquinone skeleton. The benzoquinone skeleton contained therein can be the o-benzoquinone skeleton or p-benzoquinone skeleton indicated below.

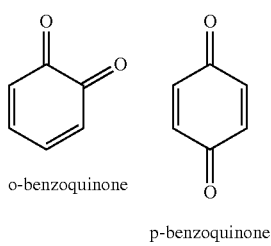
o-benzoquinone

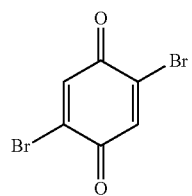
p-benzoquinone

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

(1)
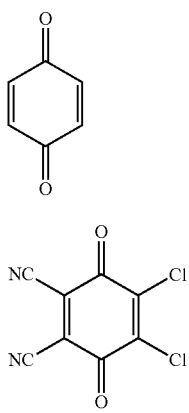

(2)
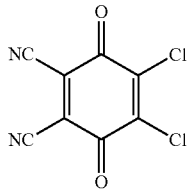

(3)
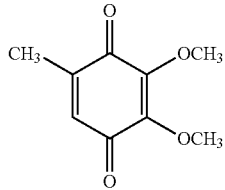

(4)
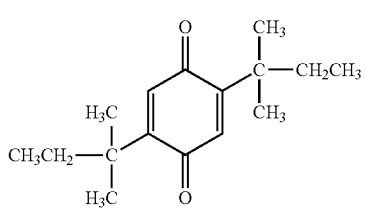

(5)
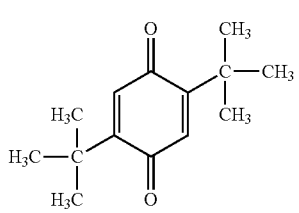

(6)
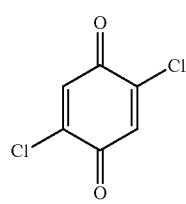

(7)
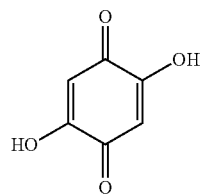

(8)
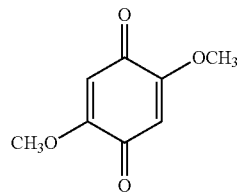

(9)
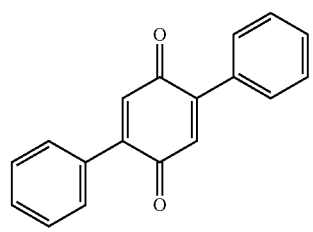

(10)
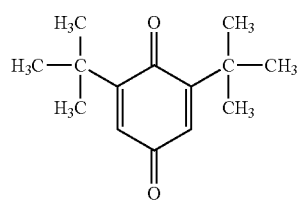

(11)
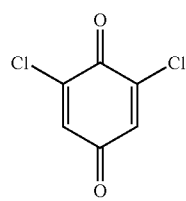

(12)
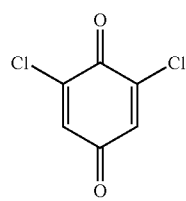

-continued
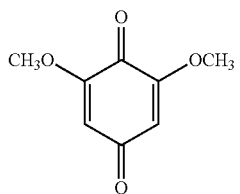
(13)
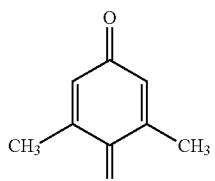
(14)
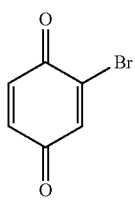
(15)
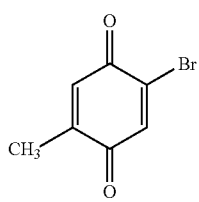
(16)
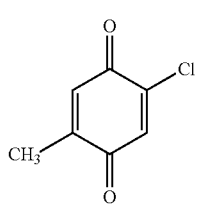
(17)
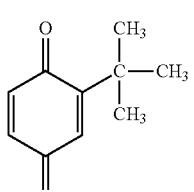
(18)
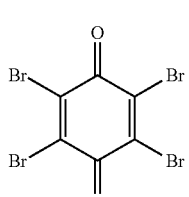
(19)
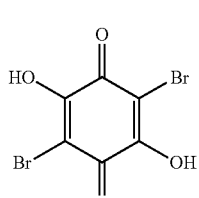
(20)
-continued
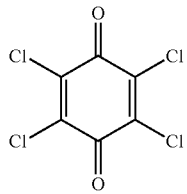
(21)
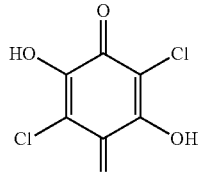
(22)
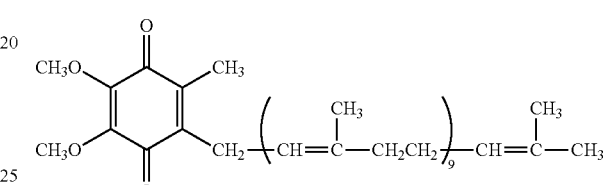
(23)
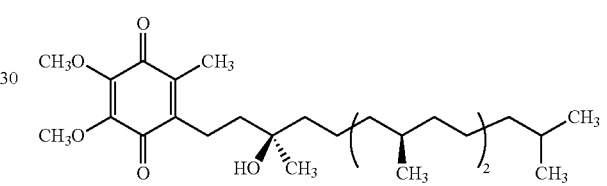
(24)
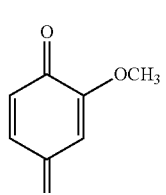
(25)
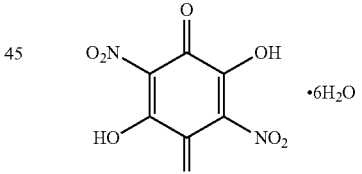
·6H$_2$O
(26)
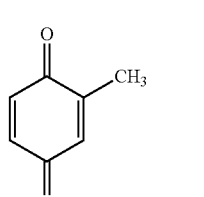
(27)
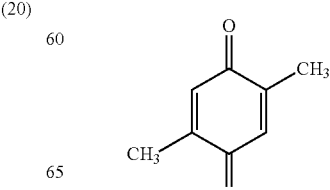
(28)

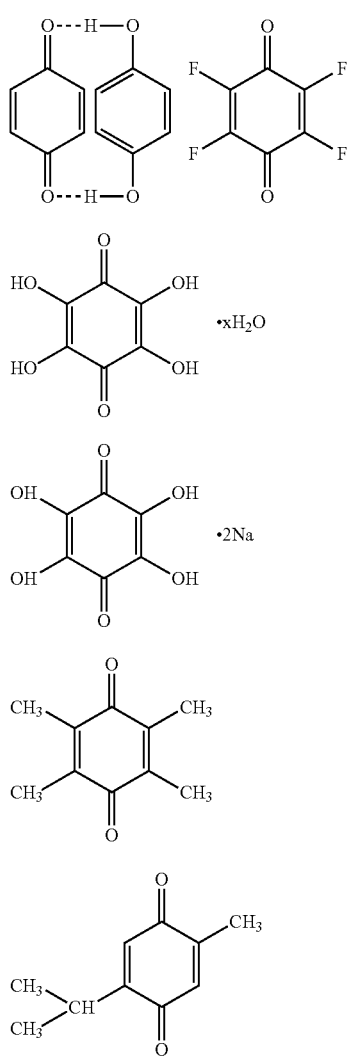

Of the above Example Compounds, Example Compounds (1) to (22) and (25) to (33) are desirable; (1) to (22), (25) to (28), (30), (32), and (33) are preferred; and compounds (1) to (22), (25) to (28), (30), and (32) are of greater preference.

The resin composition of the present invention can contain a single benzoquinone compound, or a combination of two or more such compounds.

From the perspective of achieving both stability and curability, the content of the benzoquinone compound (the combined quantities of multiple benzoquinone compounds when multiple such compounds are employed) in the resin composition of the present invention is desirably equal to or higher than 1 ppm but equal to or lower than 500,000 ppm, preferably equal to or higher than 1 ppm but equal to or lower than 400,000 ppm, and more preferably, equal to or higher than 100 ppm but equal to or lower than 100,000 ppm, based on the solid component of the radiation-curable vinyl chloride resin (based on the solid component of the radiation-curable vinyl chloride resin obtained in a reaction progressing 100 percent in a resin composition containing starting material compounds; identical below).

(iii) Compounds that can be Employed in Combination

The resin composition of the present invention contains an essential component in the form of a benzoquinone compound to achieve both long-term storage stability and curability in the radiation-curable vinyl chloride resin. However, it can also contain optional components in the form of, for example, at least one compound selected from the group consisting of phenol compounds, piperidine-1-oxyl compounds, nitro compounds, and phenothiazine compounds. In Comparative Examples described further below, this compound alone cannot readily achieve both long-term storage stability and curability in the radiation-curable vinyl chloride resin, but can contribute to achieving both long-term storage stability and curability in the radiation-curable vinyl chloride resin when employed in combination with a benzoquinone compound.

Compounds that can be employed in combination in this manner will be described below.

Phenol Compounds

The phenol compound is not specifically limited other than that it be a compound comprising a hydroxyphenyl group. The hydroxyphenyl group may comprise a substituent. Examples of the substituent are an alkyl group, alkoxy group, and hydroxyl group. The phenol compound may comprise multiple substituted or unsubstituted hydroxybenzene skeletons (polyphenol compounds). The polyphenol compound is not specifically limited. From the perspectives of availability and effect, bisphenol A, tradename Irgacure 1010 (made by Ciba Specialty Chemicals Corporation) or the like is desirable. Desirable examples of the phenol compound employed in combination are p-methoxyphenol, hydroquinone, polyphenol compounds, and 2,6-di-t-butyl-p-cresol. The phenol compound may be employed singly, or two or more such phenol compounds may be employed in combination.

Piperidine-1-oxyl Compounds

The piperidine-1-oxyl compound referred to in the present invention means a compound having the piperidine-1-oxyl structure indicated below.

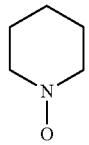

The piperidine-1-oxyl compound can be in the form of a compound comprising a substituted piperidine-1-oxyl skeleton, or an unsubstituted piperidine-1-oxyl compound. Examples of the substituents are alkyl groups, alkoxy groups, amino groups, carboxyl groups, cyano groups, hydroxyl groups, isothiocyanate groups, optionally substituted alkylcarbonylamino groups, arylcarbonyloxy groups, piperidyl ring carbon-containing carbonyl groups, and other substituents contained in Example compounds indicated below. A piperidine-1-oxyl group comprising one piperidine-1-oxyl skeleton or two or more such skeletons may be employed. Examples of desirable piperidine-1-oxyl compounds are Example compounds (1-a) to (1-l) below. Of these, Example compounds (1-f), (1-j), (1-l), (1-b), and (1-k) are desirable, and (1-f), (1-j), (1-l), and (1-b) are preferably, and (1-f), (1-j), and (1-l) are of greater preference.

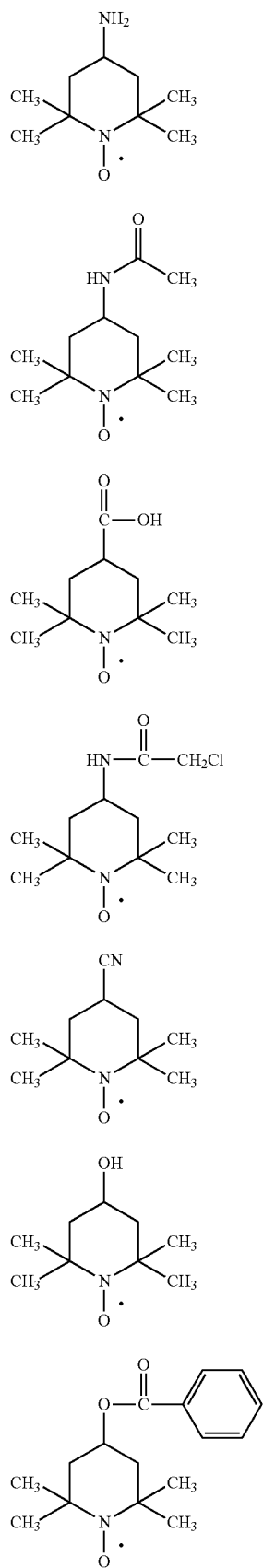
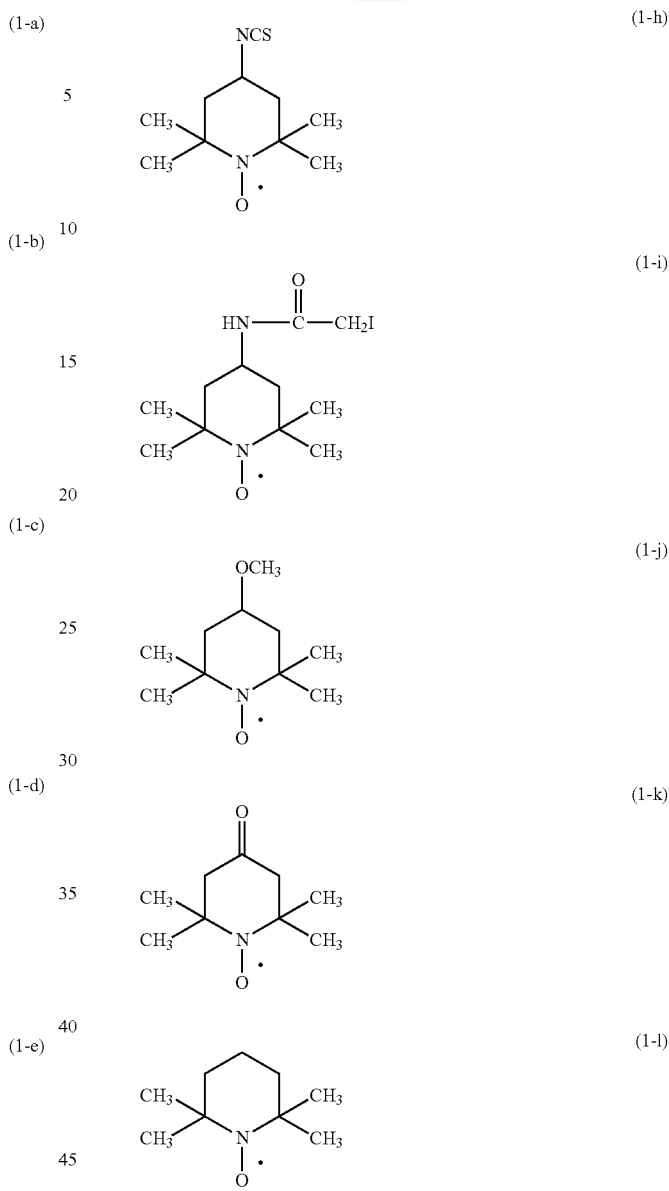

Nitro Compound

The nitro compound is not specifically limited other than that it be a compound comprising a nitro group denoted by R—NO$_2$. In this formula, the R moiety is, for example, an aryl group (desirably an aryl group having 6 to 10 carbon atoms, such as a phenyl group) or an alkyl group (desirably an alkyl group having 1 to 12 carbon atoms, such as a methyl group, ethyl group, propyl group, isopropyl group, linear or branched butyl group, linear or branched amyl group, linear or branched hexyl group, linear or branched heptyl group, linear or branched octyl group, linear or branched nonyl group, linear or branched decyl group, linear or branched undecyl group, or linear or branched dodecyl group, and optionally comprising a hetero atom). From the perspective of availability, nitrobenzene and nitromethane are preferred.

Phenothiazine Compound

The term "phenothiazine compound" means a compound having the phenothiazine skeleton indicated below.

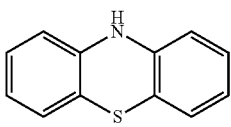 [SMILES: c1ccc2c(c1)Nc1ccccc1S2]

The phenothiazine skeleton contained in the phenothiazine compound may be substituted or unsubstituted. Examples of substituents are halogen atoms, optionally substituted amino groups, alkoxy groups, alkylthio groups, acyl groups, arylcarbonyl groups, trihalomethyl groups, and any of the other substituents contained in Example compounds indicated below.

A phenothiazine compound having one, two, or more phenothiazine skeletons may be employed. Example compounds (4-a) to (4-g) are examples of desirable phenothiazine compounds. Of these, Example compounds (4-b), (4-c), (4-d), (4-e), (4-f), and (4-g) are preferred, (4-b), (4-c), (4-d), (4-e), and (4-f) are of greater preference, and (4-c), (4-d), (4-e), and (4-f) are of even greater preference.

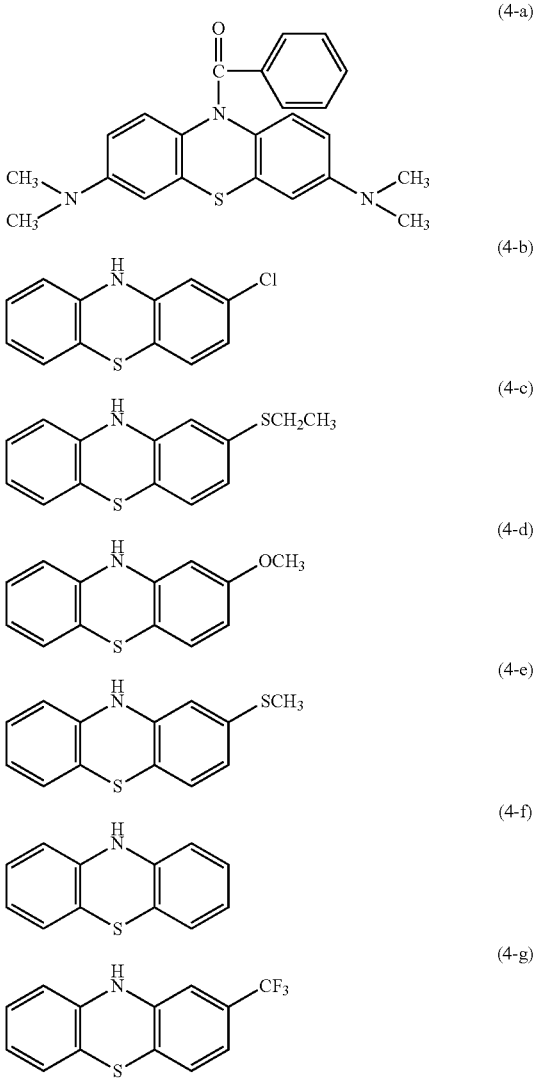

From the perspective of achieving both long-term storage stability and curability, the content of the compound employed in combination in the resin composition of the present invention (the total quantity when multiple such compounds are employed in combination) is desirably equal to or higher than 1 ppm and equal to or lower than 500,000 ppm or lower, preferably equal to or higher than 1 ppm and equal to or lower than 400,000 ppm, and more preferably, equal to or higher than 1 ppm and equal to or lower than 300,000 ppm, based on the solid component of the radiation-curable vinyl chloride resin.

The solid component concentration in the resin composition of the present invention is not specifically limited. 10 weight percent or higher is desirable, and 100 percent of the solid component is acceptable. From the perspectives of storage stability and ease of handling, a solid component concentration of about 10 to 80 weight percent is desirable, and about 20 to 60 weight percent is preferable.

The benzoquinone compound and the optionally added compound that is employed in combination may be simultaneously or successively added to the composition containing the radiation-curable vinyl chloride resin or the starting material compounds. A benzoquinone compound and one or more compounds selected from among the above optionally added compounds that can be employed in combination are desirably present in reaction systems in which the component containing a radiation curable functional group is present, such as the synthesis reaction of the radiation-curable vinyl chloride resin and the reaction introducing a radiation-curable functional group into the vinyl chloride resin. The compounds that are added to the reaction can play the role of inhibiting the radiation-curable functional groups from reacting during the reaction without loss of curability when irradiated with radiation, and the compounds that are added after the reaction are thought to play the role of enhancing storage stability without loss of curability when irradiated with radiation together with the compounds added during the reaction. Benzoquinone compounds are desirable as compounds that are added during the reaction, and the above compounds that can be employed in combination are desirable as compounds that are added after the reaction. Benzoquinone compounds can be added both during and after the reaction.

The various above-described components that are contained in the radiation-curable vinyl chloride resin composition of the present invention can be synthesized by known methods or the above-described methods, or procured as commercial products.

Method of Manufacturing Radiation-Curable Vinyl Chloride Resin Composition

The present invention further relates to a method of manufacturing the radiation-curable vinyl chloride resin composition of the present invention including the step of conducting a reaction of introducing a radiation-curable functional group into a vinyl chloride resin in the presence of a benzoquinone compound to obtain a vinyl chloride resin containing a radiation-curable functional group.

Conducting the reaction incorporating a radiation-curable functional group into vinyl chloride resin in the presence of a benzoquinone compound can inhibit the radiation-curable functional group from reacting during the above reaction, thereby increasing the long-term storage stability of radiation-curable vinyl chloride resin without loss of curability when irradiated with radiation.

The details of the manufacturing method of the present invention are as set forth above. For specific embodiments, reference can be made to Examples set forth further below. The manufacturing method of the present invention is suitable as a method of manufacturing the radiation-curable vinyl chloride resin composition of the present invention, but as stated above, the radiation-curable vinyl chloride resin composition of the present invention is not limited solely to the above-described manufacturing method.

Vinyl Chloride Resin

The present invention further relates to a vinyl chloride resin by radiation-curing the radiation-curable vinyl chloride resin composition of the present invention. The radiation that is irradiated in the curing reaction can be, for example, an electron beam or UV radiation. The use of an electron beam is desirable in that no polymerization initiator is required. The radiation can be irradiated by a known method. For the details, reference can be made to [0021] to [0023] in Japanese Unexamined Patent Publication (KOKAI) No. 2009-134838, for example. The content of the above publication is expressly incorporated herein by reference in its entirety. Known techniques such as those described in "UV•EB Curing Techniques" (published by the Sogo Gijutsu Center (Ltd.)), "Applied Techniques in Low-energy Electron Beam Irradiation" (2000, published by CMC (Ltd.)), and the like can be used for the radiation curing device and method of curing by irradiation. The contents of the above publications are expressly incorporated herein by reference in their entirety.

Magnetic Recording Medium

The magnetic recording medium of the present invention comprises a magnetic layer containing a ferromagnetic powder and a binder on a nonmagnetic support, and at least one layer obtained by curing a coating layer containing the radiation-curable vinyl chloride resin composition of the present invention with radiation.

The radiation-cured layer can be, for example, the magnetic layer. In the magnetic recording medium of the present invention, the magnetic layer and/or the nonmagnetic layer can be the radiation-cured layer when there is a nonmagnetic layer containing a nonmagnetic powder and a binder between the nonmagnetic support and the magnetic layer.

The radiation-curable vinyl chloride resin composition of the present invention can be in a stable state that changes little over time due to change in the molecular weight of the vinyl chloride resin during long-teem storage. Further, good curability can be maintained even with extended storage. Accordingly, the curing reaction due to irradiation with radiation can progress smoothly and a high-strength radiation-cured layer can be formed even when the above coating layer is formed after storing the radiation-curable vinyl chloride resin composition of the present invention for an extended period.

The magnetic recording medium of the present invention is described in greater detail below.

Binder

An example of the binder contained in the magnetic layer and nonmagnetic layer is the vinyl chloride resin of the present invention obtained by curing by irradiation the radiation-curable vinyl chloride resin composition of the present invention. Other binders may be employed in combination with the radiation-curable vinyl chloride resin of the present invention as the binder contained in the magnetic layer and nonmagnetic layer. Examples of the binders that are employed in combination are vinyl chloride resins other than the vinyl chloride resin of the present invention; polyurethane resins; polyester resins; polyamide resins; acrylic resins copolymerized with styrene, acrylonitrile, methyl methacrylate, or the like; cellulose resins such as nitrocellulose resin; epoxy resins; phenoxy resins; and polyvinyl alkyral resins such as polyvinyl acetal and polyvinyl butyral. The polyurethane resin obtained from a starting material compound in the form of a sulfonic acid (salt) group-containing polyol compound described in [0015] to [0045] in Japanese Unexamined Patent Publication (KOKAI) No. 2009-96798 is desirably employed. The content of the above publication is expressly incorporated herein by reference in its entirety. The details of this polyurethane resin are set forth in paragraphs [0046] to [0079] in the above-cited publication. Reference can also be made to Examples of the above-cited publication for details regarding synthesis methods.

When the magnetic recording medium of the present invention comprises a layer not containing the vinyl chloride resin of the present invention, the above binders can be employed as the binder in such a layer, for example. Desirable binders among those listed above are polyurethane resins, acrylic resins, cellulose resins, and vinyl chloride resin. Reference can be made to [0081] to [0094] in Japanese Unexamined Patent Publication (KOKAI) No. 2009-96798 for details regarding binder resins suitable for use in the magnetic recording medium of the present invention.

From the perspectives of both the fill rate of ferromagnetic powder and the strength of the magnetic layer, the content of binder in the magnetic layer is desirably equal to or more than 5 weight parts and equal to or less than 30 weight parts, preferably equal to or more than 10 weight parts and equal to or less than 20 weight parts, per 100 weight parts of ferromagnetic powder. In the layer containing the vinyl chloride resin of the present invention as binder, the vinyl chloride resin of the present invention desirably accounts for equal to or more than 50 weight percent, preferably 60 to 100 weight percent, and more preferably, 70 to 100 weight percent of the total quantity of binder. The same holds true for the quantity of binder employed in the nonmagnetic layer.

Magnetic Layer (i) Ferromagnetic Powder

The magnetic recording medium of the present invention comprises a ferromagnetic powder together with a binder, in the magnetic layer. Acicular ferromagnetic powder, platelike magnetic powder, spherical magnetic powder, or elliptical magnetic powder can be employed as the ferromagnetic powder. From the perspective of high-density recording, the average major axis length of the acicular ferromagnetic powder is desirably equal to or greater than 20 nm but equal to or lower than 50 nm and preferably equal to or greater than 20 nm but equal to or lower than 45 nm. The average plate diameter of the platelike magnetic powder is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording. From the perspective of high-density recording, the average diameter of the spherical magnetic powder or elliptical magnetic powder is desirably equal to or greater than 10 nm but equal to or lower than 50 nm.

In order to improve the dispersibility of microparticulate ferromagnetic powder as described above, it is desirable to use the binder containing polar groups such as those described above. From this perspective, it is preferable to use the binder in the form of the radiation-curable vinyl chloride resin containing the sulfonic acid (salt) group denoted by general formula (1), for example.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798 for the details of the above-described magnetic powders.

(ii) Additives

Additives may be added to the magnetic layer as needed. Examples of such additives are: abrasives, lubricants, dispersing agents, dispersing adjuvants, antifungal agents, antistatic agents, oxidation inhibitors, and solvents. Reference can be made to to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 $m^2/g$ (more preferably 150 to 400 $m^2/g$), the DBP oil absorption capacity is 20 to 400 ml/100 g (more preferably 30 to 200 ml/100 g), the particle diameter is 5 to 80 nm (more preferably 10 to 50 nm), the pH is 2 to 10, the moisture content is 0.1 to 10 percent, and the tap density is 0.1 to 1 g/ml. For example, the *Carbon Black Handbook* compiled by the Carbon Black Association, which is expressly incorporated herein by reference in its entirety, may be consulted for types of carbon black suitable for use in the magnetic layer. These carbon blacks are commercially available.

The types and quantities of the additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Nonmagnetic Layer

A nonmagnetic layer comprising a nonmagnetic powder and a binder can be provided between the nonmagnetic support and magnetic layer in the magnetic recording medium of the present invention. To increase running durability, the nonmagnetic layer is desirably in the form of the above-described radiation-cured layer.

The nonmagnetic powder can be an organic or inorganic substance. Examples of inorganic substances are: metals, metal oxides, metal carbonates, metal sulfates, metal nitrides, metal carbides, and metal sulfides. Carbon black may also be employed. These nonmagnetic powders are commercially available and can be manufactured by known methods.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic recording medium of the present invention.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 $kg/mm^2$, desirably 30 to 50 $kg/mm^2$ to adjust head contact. It can be measured with a thin film hardness meter (HMA-400 made by NEC Corporation) using a diamond triangular needle with a tip radius of 0.1 micrometer and an edge angle of 80 degrees as indenter tip. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is desirably 100 to 500 $m^2/g$, preferably 150 to 400 $m^2/g$. The DBP oil absorption capability is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The surface roughness of the nonmagnetic support employed in the present invention preferably ranges from 3 to 10 nm, as a center average roughness Ra at a cutoff value of 0.25 mm.

Smoothing Layer

A smoothing layer can be provided in the magnetic recording medium of the present invention. A "smoothing layer" is a layer for burying protrusions on the surface of the nonmagnetic support. In the case of a magnetic recording medium with a magnetic layer on a nonmagnetic support, it can be positioned between the nonmagnetic support and the magnetic layer, and in the case of a magnetic recording medium with a nonmagnetic layer and a magnetic layer sequentially provided on a nonmagnetic support, it can be positioned between the nonmagnetic support and the nonmagnetic layer.

The smoothing layer can be formed by curing a radiation-curable compound by irradiation with radiation.

The "radiation-curable compound" refers to a compound that has the properties of beginning to undergo polymerization or crosslinking when irradiated with radiation such as ultraviolet radiation or an electron beam, and curing into a polymer. The radiation-curable vinyl chloride resin composition of the present invention can be employed to form the smoothing layer.

Backcoat Layer

Generally, a magnetic tape used for computer data recording will be required to have better repeat running properties than a video tape or an audio tape. To maintain such a high degree of storage stability, a backcoat layer can be provided on the opposite surface of the nonmagnetic support from the surface on which the magnetic layer is provided. The backcoat layer coating liquid can be formed by dispersing particulate components such as an abrasive, an antistatic agent, and the like and binder in an organic solvent. Various inorganic pigments, carbon black, and the like can be employed as the particulate components. Resins such as nitrocellulose, phenoxy resin, vinyl chloride resin, and polyurethane can be employed singly or in combination as the binder. The radiation-curable vinyl chloride resin composition of the present invention can be used to form the backcoat layer.

Layer Structure

In the magnetic recording medium of the present invention, the thickness of the nonmagnetic support desirably ranges from 3 to 80 μm. When the above smoothing layer is provided between the nonmagnetic support and the nonmagnetic layer or the magnetic layer, the thickness of the smoothing later desirably ranges from 0.01 to 0.8 μm, and preferably 0.02 to 0.6 μm. The thickness of the above backcoat layer is, for example, 0.1 to 1.0 μm, and desirably 0.2 to 0.8 μm.

The thickness of the magnetic layer is desirably optimized based on the saturation magnetization of the head employed, the length of the head gap, and the recording signal band, and is normally 0.01 to 0.10 μm, preferably 0.02 to 0.08 μm, and more preferably, 0.03 to 0.08 μm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 μm, preferably 0.3 to 2.5 μm, and further preferably, 0.4 to 2.0 μm. The nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Manufacturing Method

The steps for manufacturing coating liquids for forming the various layers such as the magnetic layer and the nonmagnetic layer desirably include at least a kneading step, dispersing step, and mixing steps provided as needed before and after these steps. Each of these steps may be divided into two or more stages. All of the starting materials such as the ferromagnetic powder, nonmagnetic powder, binder, carbon black, abrasives, antistatic agents, lubricants, solvents and the like that are employed in the present invention can be added at the beginning or part way through any of the steps. Individual starting materials can be divided into smaller quantities and added in two or more increments. For example, the polyurethane can be divided into small quantities and incorporated during the kneading step, dispersing step, and after the dispersing step to adjust the viscosity. The above starting materials can be added simultaneously or successively to the radiation-curable polyurethane resin composition of the present invention to prepare coating liquids. For example, the powder components such as the ferromagnetic powder and nonmagnetic powder can be pulverized in a kneader, the radiation-curable vinyl chloride resin composition of the present invention (and other binder components optionally employed in combination) can be added to conduct the kneading step, various additives can be added to the kneaded product, and dispersion can be conducted to prepare a coating liquid.

To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for magnetic and nonmagnetic layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

In the method of manufacturing a magnetic recording medium of the present invention, for example, a nonmagnetic layer coating liquid can be applied to the surface of a running nonmagnetic support in a quantity calculated to yield a prescribed film thickness to form a nonmagnetic layer. A magnetic layer coating liquid can then be applied thereover in a quantity calculated to yield a prescribed film thickness to form a magnetic layer. Multiple magnetic layer coating liquids can be successively or simultaneously applied in multiple layers, or the nonmagnetic layer coating liquid and the magnetic layer coating liquid can be successively or simultaneously applied in multiple layers. When the lower layer (nonmagnetic layer) coating liquid and the upper layer (magnetic layer) coating liquid are applied successively in multiple layers, the nonmagnetic layer will sometimes partially dissolve into the solvent contained in the magnetic layer coating liquid. When the nonmagnetic layer is a radiation-cured layer, the radiation-curable component in the nonmagnetic layer is polymerized or crosslinked by irradiation with radiation to achieve a high molecular weight, so dissolution into the solvent contained in the magnetic layer coating liquid can be inhibited or reduced. Accordingly, when successively applying the lower nonmagnetic layer coating liquid and the upper magnetic layer coating liquid to form multiple layers, it is desirable to conduct irradiation with radiation before applying the upper magnetic layer coating liquid and then form the magnetic layer over the cured nonmagnetic layer. The nonmagnetic layer coating liquid employed in this case is desirably prepared using the radiation-curable vinyl chloride resin composition of the present invention.

The coating machine used to apply the magnetic layer coating liquid or nonmagnetic layer coating liquid can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which are expressly incorporated herein by reference in their entirety, for these coating machines. In the course of forming a radiation-cured layer, the coating layer that has been formed by coating the coating liquid is irradiated with radiation to cure it. The details of the processing by irradiation with radiation are as set forth above. Following the coating step, the medium can be subjected to various post-processing, such as processing to orient the magnetic layer, processing to smoothen the surface (calendering), and thermoprocessing to reduce heat contraction. Reference can be made to [0146] to [0148] of Japanese Unexamined Patent Publication (KOKAI) No. 2009-96798, for example, with regard to this processing. The magnetic recording medium that is obtained can be cut to prescribed size with a cutter, puncher, or the like for use.

Physical Characteristics

The saturation magnetic flux density of the magnetic layer preferably ranges from 100 to 300 mT (1,000 to 3,000 G). The coercivity (Hr) of the magnetic layer is preferably 143.3 to 318.4 kA/m (1,800 to 4,000 Oe), more preferably 159.2 to 278.6 kA/m (2,000 to 3,500 Oe). Narrower coercivity distribution is preferable. The SFD and SFDr are preferably equal to or lower than 0.6, more preferably equal to or lower than 0.2.

The coefficient of friction of the magnetic recording medium of the present invention relative to the head is desirably equal to or less than 0.50 and preferably equal to or less than 0.3 at temperatures ranging from $-10°$ C. to $40°$ C. and humidity ranging from 0 percent to 95 percent, and the charge potential preferably ranges from $-500$ V to $+500$ V. The modulus of elasticity at 0.5 percent extension of the magnetic layer preferably ranges from 0.98 to 19.6 GPa (100 to 2,000 kg/mm$^2$) in each in-plane direction. The breaking strength preferably ranges from 98 to 686 MPa (10 to 70 kg/mm$^2$). The modulus of elasticity of the magnetic recording medium preferably ranges from 0.98 to 14.7 GPa (100 to 1500 kg/mm$^2$) in each in-plane direction. The residual elongation is preferably equal to or less than 0.5 percent, and the thermal shrinkage rate at all temperatures below $100°$ C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz) of the magnetic layer and the nonmagnetic layer is preferably within the desirable range described above for the coating. The loss elastic modulus preferably falls within a range of $1 \times 10^7$ to $8 \times 10^8$ Pa ($1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

The radiation-curable resin has the property of polymerizing or crosslinking when irradiated with radiation to form a polymer and thus cure. The curing reaction proceeds by irradiation with radiation, so the coating liquid containing the radiation-curable resin is of a relatively low viscosity that remains stable so long as it is not irradiated with radiation. Thus, the coarse protrusions of the support surface can be covered (masked) by the leveling effect until the coating layer is cured. Accordingly, forming a radiation-cured layer can yield a magnetic recording medium of good surface smoothness and good high-density recording and reproduction characteristics. Employing a binder containing a polar group as the binder component as set forth above can increase the dispersibility of powder components such as the ferromagnetic powder and contribute to enhancing the surface smoothness of the magnetic layer. However, when there is a pronounced change in the molecular weight of the radiation-curable resin during a long period of storage, it becomes difficult to achieve a good leveling effect, causing the surface smoothness of the magnetic layer to decrease. By contrast, the long-term storage stability of the resin composition of the present invention can be good, so even when stored for an extended period, a magnetic layer of high surface smoothness can be formed. Additionally, when long-term storage stability and curability are not both present, the durability of the medium may diminish even when good surface smoothness is achieved. By contrast, the resin composition of the present invention is capable of long-term stable storage as set forth above, and can exhibit good curability following long-term storage.

As set forth above, when successively coating the lower nonmagnetic layer coating liquid and upper magnetic layer coating liquid in multiple layers, a portion of the nonmagnetic layer will sometimes dissolve into the solvent contained in the magnetic layer coating liquid. When that the nonmagnetic layer is a radiation-cured layer, dissolution of the nonmagnetic layer into the magnetic layer coating liquid can be inhibited or reduced. As a result, the decrease in smoothness of the magnetic layer due to dissolution of the nonmagnetic layer can be inhibited.

Employing the resin composition of the present invention in a coating liquid for a magnetic recording medium in this manner is advantageous in that a magnetic recording medium of good surface smoothness and durability is achieved, and contributes to enhanced productivity because the resin composition (coating liquid) can be prepared in large-quantity batches and stored for extended periods.

In the magnetic recording medium of the present invention, the center surface roughness Ra of the magnetic layer as measured with a digital optical profilometer (TOPO-3D made by WYKO) is desirably equal to or lower than 4.0 nm, preferably equal to or lower than 3.0 nm, and more preferably, equal to or lower than 2.0 nm. The maximum height of the magnetic layer $SR_{max}$ is desirably equal to or lower than 0.5 μm, the ten point average roughness $SR_z$ is desirably equal to or lower than 0.3 μm, and the center surface peak height $SR_p$ is desirably equal to or lower than 0.3 μm. The center surface valley depth $SR_v$ is desirably equal to or lower than 0.3 μm, the center surface area ratio $SS_r$ is desirably 20 to 80 percent, and the average wavelength $S\lambda a$ is desirably 5 to 300 μm. The number of surface protrusions on the magnetic layer with a height of 0.01 to 1 μm can be optionally set to within a range of 0 to 2,000, which is desirable to optimize electromagnetic characteristics and the coefficient of friction. These can be readily controlled by controlling the surface properties by means of the support filler, the particle diameter and quantity of powder that is added to the magnetic layer, the roll surface shape of the calender, and the like. Curling is desirably kept to within ±3 mm.

In the magnetic recording medium of the present invention, physical properties of the nonmagnetic layer and magnetic layer may be varied based on the objective. For example, the modulus of elasticity of the magnetic layer may be increased to improve storage stability while simultaneously employing a lower modulus of elasticity than that of the magnetic layer in the nonmagnetic layer to improve the head contact of the magnetic recording medium.

The head used to reproduce the signal that is magnetically recorded on the magnetic recording medium of the present invention is not specifically limited. An MR head is desirably employed for high-sensitivity reproduction of signals recorded at high density. The MR head that is employed as the reproduction head is not specifically limited. For example, AMR heads, GMR heads, and TMR heads may be employed. The head employed for magnetic recording is not specifically limited. However, the saturation magnetization level of the recording head is desirably equal to or higher than 1.0 T, preferably equal to or higher than 1.5 T, for high-density recording.

Storage Stabilizer for a Radiation-Curable Vinyl Chloride Resin

The storage stabilizer for a radiation-curable vinyl chloride resin of the present invention comprises a benzoquinone compound. The benzoquinone compound can make it possible to increase the storage stability without loss of curability of the radiation-curable vinyl chloride resin. For example, the addition of a benzoquinone compound to a radiation-curable vinyl chloride resin composition can reduce or inhibit change in the molecular weight of the resin component, thereby enhancing storage stability.

The storage stabilizer of the present invention can comprise one or more compounds selected from the group consisting of the above-described phenol compounds, piperidine-1-oxyl compounds, nitro compounds, and phenothiazine compounds in addition to the benzoquinone compound. The compound that is employed in combination is desirably selected from among piperidene-1-oxyl compounds and nitro compounds. In that case, the storage stabilizer of the present invention may be a single agent containing all of the components, including the benzoquinone compound and compounds that can be employed in combination, or may be a multiagent with two, three, or more components in which the first and second components are simultaneously or successively mixed during use. For example, the benzoquinone compound may be added as the first component to the starting material compounds of a radiation-curable vinyl chloride resin, and then after the reaction, the compounds that can be employed in combination can be added. The storage stabilizer of the present invention may contain a single benzoquinone compound, or may contain two or more benzoquinone compounds. The same applies to the compounds that can be employed in combination. The quantities of the benzoquinone compound and compounds that can be employed in combination in the radiation-curable vinyl chloride resin are as set forth above.

EXAMPLES

The present invention will be described in detail below based on Examples. However, the present invention is not limited to the examples. The "parts" and "percent" given in Examples are weight parts and weight percent unless specifically stated otherwise. The $^1H$ NMR measurements described below were carried out by 400 MHz NMR (AVANCE II-400 made by BRUKER) with a deuterated DMSO solvent.

1. Examples and Comparative Examples of the Radiation-Curable Vinyl Chloride Resin Composition (Resin Solution)

Example 1

To a two-liter flask was charged 416 g (124.8 g solid portion) of 30 percent cyclohexanone solution of sulfonate group-containing vinyl chloride copolymer (MR-104 from Zeon Corporation) and the mixture was stirred at a stirring rate of 210 rpm. Next, 0.5 g (4.464 mmol) of 1,4-benzoquione was added and dissolved by stirring.

Next, 0.125 g of dibutyltin laurate was added as a reaction catalyst and the mixture was heated to 40 to 50° C. with stirring. Subsequently, a radiation-curable functional group-incorporating component in the form of 13.75 g (0.09 mmol) of 2-methacryloyloxyethyl isocyanate (MOI made by Showa Denko) was added dropwise over 30 minutes. When the dropwise addition had been completed, the mixture was stirred for two hours at 40° C. and cooled to room temperature, yielding a resin solution containing radiation-curable function group (methacryloyloxy group)-containing vinyl chloride copolymer. $^1$H NMR data and its assignments are given below for the above radiation-curable function group (methacryloyloxy group)-containing vinyl chloride copolymer.

Radiation-curable function group-containing vinyl chloride copolymer (A): $^1$H-NMR (DMSO-$d_6$) δ(ppm)=6.2-6.0 (peak of C=C double bond), 5.8-5.6 (peak of C=C double bond), 4.6-4.2 (br., m), 4.1-4.0 (m), 3.9-3.2 (m), 3.1 (br., s), 2.7 (br., s), 2.6-2.0 (m), 2.0-0.8 (br., m).

The solid component of the resin solution obtained by the above steps was 31.3 percent. The weight average molecular weight (Mw) and number average molecular weight (Mn) of the radiation-curable group-containing vinyl chloride copolymer contained in the solution, as measured by the methods described further below within one day after preparing the resin solution, were Mw=51,000 and Mn=29,000. The glass transition temperature (Tg), sulfonate group concentration, and methacryloyloxy group concentration of the radiation-curable function group-containing vinyl chloride copolymer, as measured by the methods described further below, were Tg=75° C., sulfonate group concentration=70 mmol/kg, and methacryloyloxy group concentration=340 mmol/kg.

Example 2

With the exception that the MOI made by Showa Denko was replaced with 2-acryloyloxyethyl isocyanate (AOI made by Showa Denko) as the radiation-curable functional group-incorporating component, and 50 ppm of 4-hydroxy-2,2,6,6-tetramethylpiperidine-N-oxyl was added to the radiation-curable functional group-containing vinyl chloride copolymer following the reaction introducing the radiation-curable functional group, a resin solution (solid component 31.3 percent) of radiation-curable functional group-containing vinyl chloride copolymer was obtained by the same method as in Example 1. The same results as in Example 1 were obtained when NMR analysis, average molecular weight measurement, Tg measurement, sulfonate group concentration measurement, and radiation-curable functional group (acryloyloxy)-group concentration measurement were conducted in the same manner as in Example 1.

Example 3

With the exception that the 50 ppm of 4-hydroxy-2,2,6,6-tetramethylpiperidine-N-oxyl was replaced with 30 ppm of nitrobenzene, a resin solution (solid component 30 percent) of radiation-curable functional group-containing vinyl chloride copolymer was obtained by the same method as in Example 2. The results of measurement of the weight average molecular weight of the radiation-curable functional group-containing vinyl chloride copolymer in the resin solution by the same method as in Example 1 are given in Table 1.

Example 4

With the exceptions that MR-104 made by Zeon Corporation was replaced with MR-110 made by Zeon Corporation as the sulfonate group-containing vinyl chloride polymer and the benzoquinone was replaced with tetrachloro-p-benzoquinone (500 ppm relative to the radiation-curable functional group-containing vinyl chloride copolymer), a resin solution (solid component 30 percent) of radiation-curable functional group-containing vinyl chloride copolymer was obtained by the same method as in Example 1. The results of measurement of the weight average molecular weight of the radiation-curable functional group-containing vinyl chloride copolymer in the resin solution by the same method as in Example 1 are given in Table 1.

Comparative Examples 1 to 8

With the exception that the compounds added during the reaction to incorporate the radiation-curable functional groups were replaced with the compounds indicated in Table 1, resin solutions of radiation-curable functional group-containing vinyl chloride copolymers (solid component 30 percent) were obtained by the same method as in Example 1. The results of measurement of the weight average molecular weight of the radiation-curable functional group-containing vinyl chloride copolymers in the obtained resin solutions by the same method as in Example 1 are given in Table 1.

Measurement of the sulfonate group concentration and radiation-curable functional group ((meth)acryloyloxy group) concentration of the radiation-curable functional group-containing vinyl chloride copolymers contained in the resin solutions obtained in Examples 3 and 4 and Comparative Examples 1 to 8 were identical to those in Example 1.

Comparative Example 9

I. Synthesis of Sulfonate Group-Containing Diol Compound

To a flask were charged 100 mL of distilled water, 50 g (0.400 mol) of taurine, and 22.46 g of KOH made by Wako Pure Chemical Industries, Ltd. (purity 87 percent), the temperature was raised to 50° C., and the contents were fully dissolved.

Next, the internal temperature was cooled to 40° C., 140.4 g (1.080 mol) of butylglycidylether was added dropwise over 30 minutes, the temperature was increased to 50° C., and the solution was stirred for two hours. The solution was cooled to room temperature, 100 mL of toluene was added, the solution was fractionated, and the toluene layer was discarded. Next, 400 mL of cyclohexanone was added, the temperature was increased to 110° C., and the water was removed with a Dean Stark apparatus, yielding a 50 percent cyclohexanone solution of sulfonate group-containing diol compound. The $^1$H NMR data of the product are given below. From the NMR analysis results, it was determined that the product was a mixture of Example Compound (S-31) described in Japanese Unexamined Patent Publication (KOKAI) No. 2009-96798, Example Compound (S-64) described in the same publication, and other compounds.

$^1$H NMR (CDCl3): δ(ppm)=4.5 (br.), 3.95-3.80 (m), 3.50-3.30 (m), 3.25-2.85 (m), 2.65-2.5 (m), 2.45-2.35 (m), 1.6-1.50 (quintuplet), 1.40-1.30 (sextuplet), 1.00-0.90 (triplet).

II. Preparation of Radiation-Curable Functional Group-Containing Polyurethane Resin Solution To a flask were charged 57.50 g of a methyloxirane adduct of 4,4'-(propane-2,2-diyl)diphenol (BPX-1000 made by ADEKA, weight average molecular weight 1000), 6.50 g of glycerol methacrylate (Bremmer BLM made by NOF Corporation), 10.50 g of dimethylol tricyclodecane (TCDM made by OXEA), 3.40 g of the sulfonate group-containing diol compound synthesized in I above, 107.66 g of cyclohexanone, and 0.24 g of benzoquinone. Next, a solution comprised of 42.21 g of methylenebis(4,1-phenylene)=diisocyanate (MDI) (Millionate MT made by Nippon Polyurethane Industry Co., Ltd.) and 51.47 g of cyclohexanone was added dropwise over 15 minutes. Next, 0.361 g of di-n-butyltin laurate was added, the temperature was increased to 80° C., and the mixture was stirred for three hours. When the reaction had ended, 121.28 g of cyclohexanone was added, yielding a polyurethane resin solution. The results of measurement by the same method as in Example 1 of the weight average molecular weight of the radiation-curable functional group-containing polyurethane resin in the resin solution obtained are given in Table 1. The sulfonate group concentration and the radiation-curable functional group (methacryloyloxy group) concentration of the radiation-curable functional group-containing polyurethane resin contained in the obtained resin solution were measured at sulfonate group concentration=70 mmol/kg, methacryloyloxy group concentration=360 mmol/kg.

Evaluation Methods (1) Measurement of Average Molecular Weight

The average molecular weight (Mw, Mn) of the radiation-curable functional group-containing resin contained in the various resin solutions of the Examples and Comparative Examples was obtained using a DMF solution containing 0.3 percent lithium bromide by gel permeation chromatography (GPC) by standard polystyrene conversion.

(2) Sulfonic Acid (Salt) Group Concentration

The quantity of sulfur was quantified from the area of the sulfur (S) peak in fluorescence X-ray analysis and converted to the quantity of sulfur per kilogram of radiation-curable functional group-containing resin to determine the concentration of sulfonic acid (salt) groups in the radiation-curable functional group-containing resin.

(3) Measurement of the Glass Transition Temperature (Tg)

The glass transition temperature was measured by the viscoelasticity method using a RHEOVIBRON made by TOYO BALDWIN.

(4) Content of Radiation-Curable Functional Groups in Resin

The content was calculated from the NMR integration ratio.

(5) Evaluation of Storage Stability

The resin solutions obtained in Examples and Comparative Examples were stored at 23° C. under sealed conditions and the number of days until change appeared in the molecular weight was determined by GPC.

(6) Evaluation of Radiation Curability

The various resin solutions obtained in Examples and Comparative Examples were diluted to a solid component concentration of about 20 percent to prepare test solutions. The test solutions were coated with a blade (300 μm) on an aramid base and dried for two weeks at room temperature to obtain a coating film 30 to 50 μm in thickness.

Next, an electron beam irradiating apparatus was used to irradiate the coating film three times with an electron beam with an intensity of 10 kG for a total exposure of 30 kG.

Next, the film that had been irradiated with the electron beam was immersed in 100 mL of tetrahydrofuran (THF) and extracted for two hours at 60° C. At the end of the extraction, the film was washed with 100 mL of THF and dried for three hours at 140° C. under a vacuum. Subsequently, the weight of the residue (of the dried film) following extraction was adopted as the weight of the gelled component. The value calculated as the (gelled component/the weight of the coating film prior to extraction)×100 was adopted as the gelling rate, which is shown in Table 1. The higher the gelling rate, the better the coating strength and the higher the degree to which radiation curing progressed.

TABLE 1

| | Compound added | | Evaluation results | | |
|---|---|---|---|---|---|
| | During reaction incorporating radiation-curable functional groups into vinyl chloride copolymer (concentration added relative to solid component of vinyl chloride copolymer given in parentheses) | After reaction incorporating radiation-curable functional groups into vinyl chloride copolymer (concentration added relative to solid component of vinyl chloride copolymer given in parentheses) | Weight average molecular weight | Stability over time | Curability (gelling rate) |
| Ex. 1 | Benzoquinone (2,000 ppm) | None | 51,000 | 250 days or more | 85% |
| Ex. 2 | Benzoquinone (2,000 ppm) | 4-Hydroxy-2,2,6,6-tetramethyl-piperidine-N-oxyl (50 ppm) | 51,000 | 250 days or more | 85% |

TABLE 1-continued

| | Compound added | | Weight average molecular weight | Stability over time | Curability (gelling rate) |
|---|---|---|---|---|---|
| Ex. 3 | Benzoquinone (2,000 ppm) | Nitrobenzene (30 ppm) | 50,000 | 250 days or more | 85% |
| Ex. 4 | Tetrachloro-p-benzoquinone | None | 51,000 | 250 days or more | 85% |
| Comp. Ex. 1 | 2,6-Di-t-butyl-4-hydroxytoluene (200 ppm) | None | 51,000 | 7 days | 70% |
| Comp. Ex. 2 | Hydroquinone (200 ppm) | None | 51,000 | 10 days | 60% |
| Comp. Ex. 3 | Hydroquinone (200 ppm) | None | 51,000 | 15 days | 60% |
| Comp. Ex. 4 | 2,6-Di-t-butyl-4-hydroxytoluene (2000 ppm) | None | 51,000 | 30 days | 25% |
| Comp. Ex. 5 | 4-Hydroxy-2,2,6,6-tetramethyl-piperidine-N-oxyl (2,000 ppm) | None | 51,000 | 90 days | 15% |
| Comp. Ex. 6 | 2,6,6-Tetramethyl-piperidine-N-oxyl (2,000 ppm) | None | 51,000 | 90 days | 15% |
| Comp. Ex. 7 | Nitrobenzene (2,000 ppm) | None | 51,000 | 90 days | 15% |
| Comp. Ex. 8 | Nitromethane (2,000 ppm) | None | 51,000 | 90 days | 15% |

| | Compound added During polyurethane polymerization (concentration added relative to solid component of polyurethane given in parentheses) | After polyurethane polymerization | Weight average molecular weight | Stability over time | Curability (gelling rate) |
|---|---|---|---|---|---|
| Comp. Ex. 9 | Benzoquinone (2,000 ppm) | None | 36,000 | 250 days or more | 5% |

Evaluation Results

As shown in Table 1, among Comparative Examples 1 to 8, in which compounds other than benzoquinone compounds were employed, those exhibiting good curability exhibited lower stability over time (Comparative Examples 1 to 3), and those exhibiting good stability over time exhibited decreased curability (Comparative Example 4 to 8). From these results, it was understood that for compounds other than benzoquinone compounds, it was difficult to achieve both storage stability and curability.

By contrast, in Examples 1 to 4, in which benzoquinone compounds were employed, the resin solutions of vinyl chloride copolymer exhibited good stability over time. Further, in contrast to the decrease in curability when components normally capable of raising long-term storage stability were added, as in Comparative Examples 4 to 8, the gelling rates were high and the curability was good in the cured films obtained by irradiation with radiation in Examples 1 to 4. Examples 2 and 3 were examples in which the compounds employed alone in Comparative Examples 5 and 7 were employed in combination with benzoquinone compounds. From the results of Examples 2 and 3, it will be understood that despite the difficulty of achieving both stability over time and curability when employed alone, their use in combination with benzoquinone compounds contributed to achieving both stability over time and curability.

Comparative Example 9 is an example of an attempt to achieve both stability over time and curability in a radiation-curable functional group-containing polyurethane resin solution in which a benzoquinone compound was employed. However, as shown in Table 1, curability was poor despite good stability over time.

The above results indicate that benzoquinone compounds had a specific effect on radiation-curable vinyl chloride resin compositions, making it possible to achieve good storage stability without a loss in curability.

Reference Experiments

It is known that polyfunctional (meth)acrylate monomer is normally produced as a by-product of the synthesis of radiation-curable resins. Thus, the production of difunctional methacrylate monomer (referred to as "methacrylate monomer A" hereinafter) was anticipated during the synthesis of radiation-curable functional group-containing vinyl chloride copolymer (A) in Example 1.

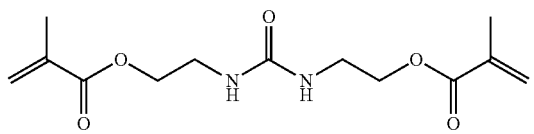 [SMILES: C=C(C)C(=O)OCCNC(=O)NCCOC(=O)C(=C)C]

Accordingly, the production of by-product methacrylate monomer A was confirmed by the following method.

(1) Synthesis of Methacrylate Monomer a

A 10 g quantity of 2-methacryloyloxyethyl isocyanate (MOI, made by Showa Denko) was dissolved in 100 mL of acetone. Within an internal temperature range of 30 to 50° C., 100 g of water was added dropwise and the mixture was stirred for two hours. A 200 g quantity of ethyl acetate was added and the mixture was stirred for 10 minutes. It was then left standing and the aqueous phase was discarded. A 100 g quantity of water was added and the mixture was stirred for 10 minutes. It was then left standing and the aqueous phase was discarded. The organic phase obtained was condensed and dried in an evaporator at an external temperature of 40° C. The NMR data of the products and the data assignments are given below.

$^1$H-NMR (400 MHz, DMSO, 25° C.): 6.12 (2H, t), 6.05 (2H, s), 5.68 (2H, t), 4.05 (4H, t), 3.82 (4H, q), 1.88 (6H, s) ppm

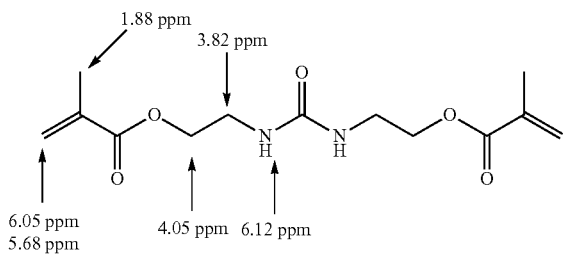 [SMILES: C=C(C)C(=O)OCCNC(=O)NCCOC(=O)C(=C)C]

(2) Confirmation of Methacrylate Monomer a by-Product

Representative proton assignments for the NMR data of 2-methacryloyloxyethyl isocyanate are as indicated below. As is clear from the NMR data of radiation-curable functional group-containing vinyl chloride copolymer (A), methacrylate monomer A, and 2-methacryloyloxyethyl isocyanate, the 6.12 ppm proton peak was only exhibited by methacrylate monomer A. The presence of this peak confirmed that methacrylate monomer A had been produced as a by-product. Accordingly, $^1$H NMR measurement of the resin solution obtained in Example 1 confirmed a 6.12 ppm proton peak. Based on this result, the production of by-product methacrylate monomer A in Example 1 was confirmed.

The contents of radiation-curable functional group-containing vinyl chloride copolymer (A) and methacrylate monomer A in the resin solution obtained in Example 1 can be calculated according to the following method. By comparing the value of integral of radiation-curable functional group-containing vinyl chloride copolymer (A) with that of methacrylate monomer A in the NMR data, the ratio of the quantity of 2-methacryloyloxyethyl isocyanate incorporated into radiation-curable functional group-containing vinyl chloride copolymer (A) to the quantity incorporated into methacrylate monomer A revealed the ratio of the former:latter=47.8:52.2. No unreacted 2-methacryloyloxyethyl isocyanate was detected. From these results and quantities charged, the content of radiation-curable functional group-containing vinyl chloride copolymer (A) was calculated as 131.4 g and that of methacrylate monomer A as 7.18 g.

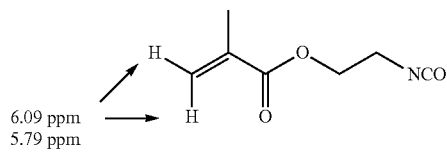

As set forth above, methacrylate monomer A by-product was confirmed in Example 1. However, the presence of methacrylate monomer A did not greatly affect either the irradiation curability or the glass transition temperature of the radiation-curable composition. To demonstrate these points, a resin solution containing no methacrylate monomer A was prepared by the following method as Example 1-1.

Example 1-1

A resin solution was obtained by the same method as in Example 1. A 200 g quantity of acetone was added at an internal temperature of 50° C. to 200 g of the resin solution obtained. Subsequently, a solid product precipitated out when 500 g of methanol was added within an internal temperature range of 45 to 55° C. The solid product that precipitated out was filtered. A 300 g quantity of acetate was added and the mixture was fully dissolved with stirring at 50° C. A solid product precipitated out when 500 g of methanol was added within an internal temperature range of 45 to 55° C. The solid product that precipitated out was filtered and dried for 24 hours at 30° C. under a vacuum.

No proton peak at 6.12 ppm was found in $^1$H NMR measurement of the product obtained by the above operation. Based on this result, methacrylate monomer A that was a by-product of the reaction product was determined to have been successfully eliminated by the above operation.

Next, the radiation curability and glass transition temperature of the product obtained by the above operation were measured by the above-described methods. This revealed a gelling rate of 84 percent and a glass transition temperature of 75° C., which were nearly equivalent to the results obtained in Example 1.

Based on these results, the polyfunctional (meth)acrylate monomer produced as a by-product during synthesis was determined not to have a major effect on either the radiation curability or glass transition temperature of the radiation-curable composition.

Next, synthesis examples of radiation-curable functional group-containing vinyl chloride copolymers (A)' and (A)" having different methacryloyloxy group concentrations than the radiation-curable functional group-containing vinyl chloride copolymer (A) obtained in Example 1 will be given next.

Example 1-2

Synthesis of Radiation-Curable Functional Group-Containing Vinyl Chloride Copolymer (A)'

With the exception that the quantity of 2-methacryloyloxyethyl isocyanate added dropwise was changed to 6.88 g (0.04 mol), a resin solution containing radiation-curable functional group-containing vinyl chloride copolymers (A)' was obtained by the same method as in Example 1. The production of by-product methacrylate monomer A by the above method was confirmed for the resin solution obtained.

In the same manner as in the reference experiments described above, the contents of radiation-curable functional group-containing vinyl chloride copolymer (A)' and methacrylate monomer A in the resin solution can be calculated according to the following method.

By comparing the value of integral of radiation-curable functional group-containing vinyl chloride copolymer (A)' with that of methacrylate monomer A in the NMR data, the ratio of the quantity of 2-methacryloyloxyethyl isocyanate incorporated into radiation-curable functional group-containing vinyl chloride copolymer (A)' to the quantity incorporated into methacrylate monomer A revealed the ratio of the former:latter=63.5:36.5. No unreacted 2-methacryloyloxyethyl isocyanate was detected. From these results and quantities charged, the content of radiation-curable functional group-containing vinyl chloride copolymer (A)' was calculated as 129.2 g and that of methacrylate monomer A as 2.51 g.

Calculation of the methacryloyloxy group concentration and measurement of the glass transition temperature of the radiation-curable vinyl chloride copolymer (A)' by the above methods revealed a methacryloyloxy group concentration of 230 mmol/kg and a glass transition temperature of 73° C.

Examples 1-3

Synthesis of Radiation-Curable Functional Group-Containing Vinyl Chloride Copolymer (A)"

With the exception that the quantity of 2-methacryloyloxyethyl isocyanate added dropwise was changed to 3.43 g (0.02 mol), a resin solution containing radiation-curable functional group-containing vinyl chloride copolymer (A)" was obtained by the same method as in Example 1. The production of by-product methacrylate monomer A by the above method was confirmed for the resin solution obtained.

In the same manner as in the reference experiments described above, the contents of radiation-curable functional group-containing vinyl chloride copolymer (A)" and methacrylate monomer A in the resin solution can be calculated according to the following method.

By comparing the value of integral of radiation-curable functional group-containing vinyl chloride copolymer (A)" with that of methacrylate monomer A in the NMR data, the ratio of the quantity of 2-methacryloyloxyethyl isocyanate incorporated into radiation-curable functional group-containing vinyl chloride copolymer (A)" to the quantity incorporated into methacrylate monomer A revealed the ratio of the former:latter=77.4:22.6. No unreacted 2-methacryloyloxyethyl isocyanate was detected. From these results and quantities charged, the content of radiation-curable functional group-containing vinyl chloride copolymer (A)" was calculated as 127.5 g and that of methacrylate monomer A as 9.78 g.

Calculation of the methacryloyloxy group concentration and measurement of the glass transition temperature of the radiation-curable vinyl chloride copolymer (A)" by the above methods revealed a methacryloyloxy group concentration of 140 mmol/kg and a glass transition temperature of 75° C.

2. Examples and Comparative Examples of Magnetic Recording Media

Example 5

Preparation of Magnetic Layer Coating Liquid

One hundred parts of acicular ferromagnetic micropowder (average major axis length 35 nm) were comminuted for 10 minutes in an open kneader. Subsequently, 15 parts based on the solid component of the radiation-curable functional group-containing vinyl chloride resin solution of Example 1 were added and the mixture was kneaded for 60 minutes. To the kneaded product were added two parts of abrasive ($Al_2O$, particle size 0.3 μm), two parts of carbon black (particle size 40 μm), and 200 parts of methyl ethyl ketone/toluene=1/1 mixed solvent, and the mixture was dispersed for 360 minutes in a sand mill.

To the dispersion obtained were added two parts of butyl stearate, one part of stearic acid, and 50 parts of cyclohexanone. The mixture was mixed for another 20 minutes, after which it was passed through a filter having an average pore diameter of 1 μm to prepare a magnetic layer coating liquid.

<Preparation of Nonmagnetic Layer Coating Liquid>

Eighty-five parts of $\alpha$-$Fe_2O_3$ (average particle diameter 0.15 μm, $S_{BET}$ 52 m$^2$/g, surface treated with $Al_2O_3$ and $SiO_2$, pH 6.5 to 8.0) were comminuted for 10 minutes in an open kneader. Subsequently, 7.5 parts based on the solid component of the radiation-curable functional group-containing vinyl chloride resin solution of Example 1, parts based on the solid component of the radiation-curable functional group-containing polyurethane resin solution prepared in Reference Preparation Example 1, and 60 parts of cyclohexanone were added and the mixture was kneaded for 60 minutes. To the kneaded product were added 200 parts of a methyl ethyl ketone/cyclohexanone=6/4 mixed solvent, and the mixture was dispersed for 120 minutes in a sand mill.

To the dispersion obtained were added two parts of butyl stearate, one part of stearic acid, and 50 parts of methyl ethyl ketone. The mixture was mixed for another 20 minutes, after which it was passed through a filter having an average pore diameter of 1 μm to prepare a nonmagnetic layer coating liquid.

Reference Preparation Example 1

With the exception that the benzoquinone added during polyurethane synthesis was replaced with 0.240 g of p-methoxyphenol and 50 ppm based on the polyurethane solid component of 4-hydroxy-2,2,6,6-tetramethylpiperidine-N-oxyl was added following synthesis in the preparation of the radiation-curable functional group-containing polyurethane resin solution, radiation-curable functional group-containing polyurethane resin solution (solid component 30 percent) was obtained by the same method as in Comparative Example 9.

The average molecular weight, sulfonate group concentration, and radiation-curable polyfunctional group (methacryloyloxy group) concentration of the radiation-curable functional group-containing polyurethane resin contained in the resin solution obtained were measured by the above-described methods, revealing a weight average molecular weight=38,000, a number average molecular weight=24,000, a sulfonate group concentration=69.66 mmol/kg, and a methacryloyloxy group concentration=355.44 mmol/kg.

<Preparation of Magnetic Recording Medium>

An adhesive layer in the form of a sulfonic acid-containing polyester resin was coated with a coil bar so as to yield a dry thickness of 0.1 μm on the surface of a polyethylene terephthalate support 7 μm in thickness.

Next, the nonmagnetic layer coating solution obtained was coated to a thickness of 1.5 μm over the adhesive layer to form a coating layer. The coating layer was irradiated with a 30 kG electron beam to form a nonmagnetic layer (radiation-cured layer). Immediately thereafter, the magnetic layer coating liquid was applied so as to yield a dry thickness of 0.1 μm on the nonmagnetic layer that had been formed. The nonmagnetic support upon which had been coated the magnetic coating liquid was magnetic field oriented with a 0.5 tesla (5,000 gauss) Co magnet and a 0.4 tesla (4,000 gauss) solenoid magnet while the magnetic layer coating liquid was still wet. Subsequently, the coating layer of the magnetic layer coating liquid was irradiated with a 30 kG electron beam to form a magnetic layer (radiation-cured layer). Next, calendering was conducted with a seven-stage metal roll combination at a rate of 100 m/min, a linear pressure of 300 kg/cm, and a temperature of 90° C., after which the product was slit to a width of ½ inch (17.7 mm) to obtain a magnetic tape.

Example 6

With the exception that the radiation-curable functional group-containing vinyl chloride resin solution of Example 2 was employed instead of the radiation-curable functional group-containing vinyl chloride resin solution of Example 1 during preparation of the nonmagnetic layer coating liquid, a magnetic tape was prepared by the same method as in Example 5.

Example 7

With the exception that hexagonal plate-like ferrite micropowder (average plate diameter 10 nm) was employed instead of the acicular ferromagnetic micropowder (average major axis length 35 nm) during the preparation of the magnetic layer coating liquid, a magnetic tape was prepared by the same method as in Example 5.

Comparative Example 10

With the exceptions that the radiation-curable functional group-containing vinyl chloride resin solution of Comparative Example 1 was employed instead of the radiation-curable functional group-containing vinyl chloride resin solution of Example 1 during the preparation of the magnetic layer coating liquid and the radiation-curable functional group-containing vinyl chloride resin solution of Comparative Example 1 was employed instead of the radiation-curable functional group-containing vinyl chloride resin solution of Example 1 during the preparation of the nonmagnetic layer coating liquid, a magnetic tape was prepared by the same method as in Example 5.

Evaluation Methods

The magnetic tapes prepared in Examples 5 to 7 and in Comparative Example 10 were evaluated as set forth above. The results are given in Table 2.

(1) Surface Smoothness of the Magnetic Layer

Using a Nanoscope II made by Digital Instruments Inc., a 30 μm×30 μm area was scanned at a tunnel current of 10 nA and a bias current of 400 mV to determine the number of protrusions 10 nm to 20 nm in height. This number was expressed as a value relative to the value of Comparative Example 10, which was adopted as 100.

(2) Electromagnetic Characteristic (S/N Ratio)

The S/N ratio of each of the magnetic tapes was measured in a ½ inch linear system with a fixed head. The relative velocity of the head/tape was 10 m/s. Recording was conducted at a recording current set to the optimal current of each tape using an MIG head (track width 18 μm) with a saturation magnetization of 1.4 T. An anisotropic MR (A-MR) head with a shield spacing of 0.2 μm and an element thickness of 25 nm was employed as the reproduction head.

A signal with a recording wavelength of 0.2 μm was recorded and the reproduction signal was frequency analyzed with a spectral analyzer made by Shibasoku. The ratio of the output of the carrier signal (wavelength 0.2 μm) to the noise integrated over the entire spectral region was adopted as the S/N ratio and given as a value relative to Comparative Example 10, which was adopted as 0 dB.

(3) Repeat Sliding Durability

The surface of the magnetic layer was contacted with a round rod of AlTiC in a 40° C., 10 percent RH environment, a load of 100 g (T1) was applied, and the tape was repeatedly slid back and forth for 10,000 passes at 2 m/s. At that time, damage to the tape was inspected visually and by optical microscopy (magnification: 100 to 500-fold). An evaluation was then made based on the following rankings:

Excellent: Some scratching evident, but most portions unscratched.

Good: More scratched portions than unscratched portions.

Poor: Complete separation of the magnetic layer.

(4) Storage Property

A 600 m length of tape was wound on the reels of an LTO-G3 cartridge and stored for two weeks at 60° C. and 90 percent RH. Following storage, the sliding durability of the tape was measured by the same method as in (3) above.

TABLE 2

| | Vinyl chloride resin solution | Smoothness | Electromagnetic characteristic | Repeat sliding durability | Storage property |
|---|---|---|---|---|---|
| Ex. 5 | Magnetic layer: Ex. 1 Nonmagnetic layer: Ex. 1 | 92 | 0.7 | Excellent | Excellent |
| Ex. 6 | Magnetic layer: Ex. 1 Nonmagnetic layer: Ex. 2 | 87 | 0.7 | Excellent | Excellent |
| Ex. 7 | Magnetic layer: Ex. 1 Nonmagnetic layer: Ex. 1 | 91 | 0.7 | Excellent | Excellent |
| Comp. Ex. 10 | Magnetic layer: Comp. Ex. 1 Nonmagnetic layer: Comp. Ex. 1 | 100 | 0 | Poor | Poor |

Evaluation Results

As indicated in Table 2, the magnetic tapes of Examples 5 to 7 exhibited better results in all categories of evaluation than the magnetic tape of Comparative Example 10. The present inventors presumed these results to be due to the following.

The reason the magnetic tapes of Examples 5 to 7 exhibited excellent smoothness was that the magnetic layer coating liquid was applied after radiation curing of the nonmagnetic layer, making it possible to inhibit mixing between layers caused by dissolution of the nonmagnetic layer into the magnetic layer coating liquid. Due to the good curability of the radiation-curable functional group-containing vinyl chloride resin employed as the nonmagnetic layer binder, the fact that a strong coating was formed by irradiation with radiation also contributed to inhibiting mixing between layers. Further, the fact that enhanced dispersion was achieved due to the sulfonic acid (salt) groups contained in the binders of both the nonmagnetic layer and magnetic layer was also thought to have improved smoothness. The reason the magnetic tapes of Examples 5 to 7 exhibited good electromagnetic characteristics was also due to good surface property of the magnetic layer, as set forth above.

The reason the magnetic tapes of Examples 5 to 7 exhibited good repeat sliding durability was the formation of strong coatings due to the good curability of the radiation-curable functional group-containing vinyl chloride resin solution employed in the magnetic layer.

When the nonmagnetic layer is insufficiently cured, the level of migration of nonmagnetic layer components to the magnetic layer side increases. When the magnetic layer is insufficiently cured, the quantity of various compounds seeping out from the surface of the magnetic layer increases. When such phenomena occur, the tape sticks during storage, and precipitates form on the surface of the tape, and the like, compromising storage properties. The magnetic tapes of Example 5 to 7 exhibited good storage properties because the magnetic layer and nonmagnetic layer both had good radiation curability. In Examples 5 to 7, the present inventors presume that the reason Example 6 exhibited the best smoothness was that a radiation-curable functional group-containing vinyl chloride resin solution (Example 2), in which a piperidine-1-oxyl compound was employed in combination with benzoquinone, was used in the formation of the nonmagnetic layer. During preparation of the nonmagnetic layer coating liquid, the generation of heat due to shear stress during dispersion is thought to cause some of the radiation-curable functional groups to react. When a piperidine-1-oxyl compound is employed in combination with benzoquinone, such reaction is effectively prevented, which is thought to contribute to inhibiting mixing between layers and further enhance smoothness.

Based on the results of Tables 1 and 2 as set forth above, the present invention exhibited the ability to maintain good storage stability for an extended period in radiation-curable vinyl chloride resins without a loss of curability by irradiation with radiation.

The magnetic recording medium of the present invention can exhibit good durability and storage properties, and is thus suitable as a backup tape for which good repeat running durability and storage properties are required.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:
1. A radiation-curable vinyl chloride resin composition comprising a vinyl chloride resin containing a radiation-curable functional group, and/or starting material compounds thereof, as well as a benzoquinone compound, and at least one piperidine-1-oxyl compound,
wherein the piperidine-1-oxyl compound is at least one selected from the group consisting of (1-b) to (1-e) and (1-g) to (1-j) below:

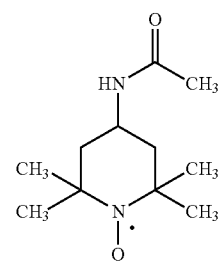
(1-b)

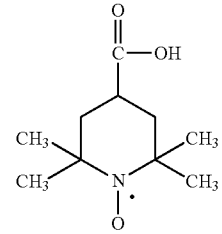
(1-c)

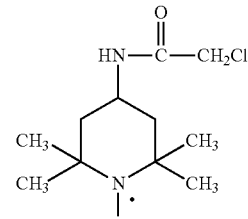
(1-d)

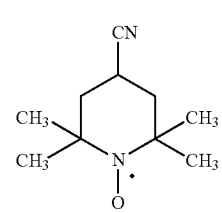
(1-e)

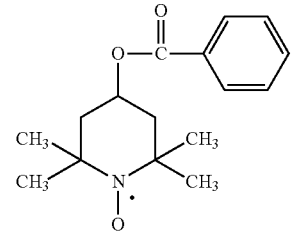
(1-g)

-continued

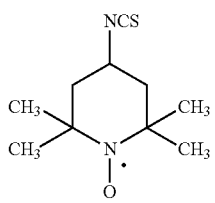

(1-h)

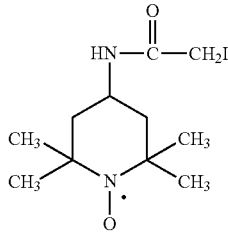

(1-i)

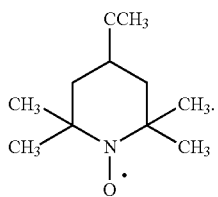

(1-j)

2. The radiation-curable vinyl chloride resin composition according to claim 1, wherein the radiation-curable functional group is a (meth)acryloyloxy group.

3. The radiation-curable vinyl chloride resin composition according to claim 1, wherein the vinyl chloride resin comprises a sulfonic acid (salt) group.

4. The radiation-curable vinyl chloride resin composition according to claim 1, which comprises the benzoquinone compound in a quantity of equal to or higher than 100 ppm but equal to or lower than 100,000 ppm, relative to the vinyl chloride resin.

5. The radiation-curable vinyl chloride resin composition according to claim 1, which is used as a coating liquid for forming a magnetic recording medium or used for preparing the coating liquid.

6. A method of manufacturing the radiation-curable vinyl chloride resin composition of claim 1, wherein
the radiation-curable vinyl chloride resin composition is the radiation-curable vinyl chloride resin composition of claim 1, and
the method comprises conducting a reaction of introducing a radiation-curable functional group into a vinyl chloride resin in the presence of a benzoquinone compound to obtain a vinyl chloride resin containing a radiation-curable functional group and, after conducting the reaction of introducing the radiation-curable functional group, adding the piperidine-1-oxyl compound recited in claim 1 to the reaction mixture.

7. A vinyl chloride resin obtained by radiation-curing a radiation-curable vinyl chloride resin composition, wherein the radiation-curable vinyl chloride resin composition is the radiation-curable vinyl chloride resin composition according to claim 1.

8. A magnetic recording medium comprising a magnetic layer containing a ferromagnetic powder and a binder on a nonmagnetic support, which comprises at least one radiation-cured layer obtained by radiation-curing a coating layer comprising a radiation-curable vinyl chloride resin composition, the radiation-curable vinyl chloride resin composition being the radiation-curable vinyl chloride resin composition according to claim 1.

9. The magnetic recording medium according to claim 8, wherein the radiation-cured layer is the magnetic layer.

10. The magnetic recording medium according to claim 8, which comprises a nonmagnetic layer containing a nonmagnetic powder and a binder between the nonmagnetic support and the magnetic layer, the nonmagnetic layer being the radiation-cured layer.

11. The magnetic recording medium according to claim 8, wherein the radiation-curable functional group is a (meth)acryloyloxy group.

12. The magnetic recording medium according to claim 8, wherein the vinyl chloride resin comprises a sulfonic acid (salt) group.

13. The magnetic recording medium according to claim 8, wherein the radiation-curable vinyl chloride resin composition comprises the benzoquinone compound in a quantity of equal to or higher than 100 ppm but equal to or lower than 100,000 ppm, relative to the vinyl chloride resin.

14. The method of manufacturing a radiation-curable vinyl chloride resin composition according to claim 6, which further comprises, after conducting the reaction of introducing the radiation-curable functional group, adding a nitro compound to the reaction mixture together with the piperidine-1-oxyl compound.

15. The method of manufacturing a radiation-curable vinyl chloride resin composition according to claim 14, wherein the nitro compound is selected from the group consisting of nitrobenzene and nitromethane.

* * * * *